(12) United States Patent
Luo

(10) Patent No.: US 8,111,333 B2
(45) Date of Patent: Feb. 7, 2012

(54) VIDEO BIT-STREAM GAMMA-CORRECTION METHOD AND A MULTIPOINT CONTROL UNIT

(75) Inventor: Zhong Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 924 days.

(21) Appl. No.: 12/128,287

(22) Filed: May 28, 2008

(65) Prior Publication Data

US 2008/0231688 A1 Sep. 25, 2008

Related U.S. Application Data

(63) Continuation of application No. PCT/CN2006/001671, filed on Jul. 14, 2006.

(30) Foreign Application Priority Data

Nov. 28, 2005 (CN) .......................... 2005 1 0124080

(51) Int. Cl.
*H04N 5/202* (2006.01)
(52) U.S. Cl. ....................................................... 348/674
(58) Field of Classification Search .......... 348/674–677; 358/519
See application file for complete search history.

(56) References Cited

U.S. PATENT DOCUMENTS

| | | | |
|---|---|---|---|
| 5,047,858 A * | 9/1991 | Aimonoya | 348/218.1 |
| 5,473,366 A | 12/1995 | Imaeda et al. | |
| 5,729,363 A * | 3/1998 | Aihara et al. | 386/224 |
| 6,137,542 A | 10/2000 | Van Mourik | |
| 6,943,836 B2 | 9/2005 | Kitagawa | |
| 2002/0063784 A1 | 5/2002 | Kitagawa | |
| 2008/0231688 A1 | 9/2008 | Luo | |

FOREIGN PATENT DOCUMENTS

| | | |
|---|---|---|
| CN | 1291403 | 4/2001 |
| CN | 1356828 | 7/2002 |
| CN | 1192619 C | 3/2005 |
| CN | 1852414 A | 10/2006 |
| EP | 1906673 A1 | 4/2008 |
| JP | 6165167 | 6/1994 |

(Continued)

OTHER PUBLICATIONS

International Search Report for International Application No. PCT/CN2006/001671, dated Nov. 2, 2006, and English translation thereof.

(Continued)

*Primary Examiner* — Michael Lee
(74) *Attorney, Agent, or Firm* — Slater & Matsil, L.L.P.

(57) ABSTRACT

A video bit-stream gamma characteristic correction method and a multipoint control unit in video communication field resolve the gamma distortion problem of video image in the existing multimedia communication. In the method, the receiving end carries out correction once through carrying the gamma characteristic parameter of the transmission end in the video bit-stream; or the multipoint control unit and the receiving end correct gamma distortion of the video image in multiple steps. A multipoint processor (200) of the multipoint control unit includes a gamma characteristic parameter storing module (201), which stores gamma characteristic parameter of the video image transmission end; and a gamma characteristic correction module (202), which is connected to the gamma characteristic parameter storing module and corrects the gamma characteristic of the video image according to the gamma characteristic parameter of the video image transmission end.

24 Claims, 15 Drawing Sheets

FOREIGN PATENT DOCUMENTS

| | | |
|---|---|---|
| JP | 9-233440 A | 9/1997 |
| JP | 2000067226 A | 3/2000 |
| JP | 2001-197458 A | 7/2001 |

OTHER PUBLICATIONS

European Search Report for European Patent Application No. 06753139.2, dated Oct. 29, 2008.

International Telecommunication Union, "Video Codec for Audiovisual Services at p x 64 kbits,", ITU-T Telecommunication Standardization Sector of ITU, H.261, Line Transmission of Non Telephone Signals, Mar. 1993, 28 pages.

International Telecommunication Union, Series H: Audiovisisual and Multimedia Systems, Infrastructue of audiovisual services—Coding of moving video, ITU-T Telecommunication Standardization Sector of ITU, H.264, Advanced video coding for generic audiovisual services, May 2003, 272 pages.

International Telecommunication Union, Series H: Audiovisisual and Multimedia Systems, Infrastructue of audiovisual services—Coding of moving video, ITU-T Telecommunication Standardization Sector of ITU, H.263, Video coding for low bit rate communication, Jan. 2005, 226 pages.

First Chinese Office Action, Chinese Application No. 200510124080.2, Maiing date: Jan. 18, 2008, 6 pages.

\* cited by examiner

VIDEO BIT-STREAM GAMMA-CORRECTION METHOD AND A MULTIPOINT CONTROL UNIT

CROSS-REFERENCE TO RELATED APPLICATIONS

This application is a continuation of International Application No. PCT/CN2006/001671, filed Jul. 14, 2006. This application claims the benefit of Chinese Application No. 200510124080.2, filed Nov. 28, 2005. The disclosures of the above applications are incorporated herein by reference.

FIELD

The present disclosure relates to the technical field of multimedia communications, and in particular, to a method for correcting the Gamma characteristics of a video bit stream in video communications and a multipoint control unit.

BACKGROUND

The statements in this section merely provide background information related to the present disclosure and may not constitute prior art.

Video communications enjoy an increasingly broad range of applications with the rapid development of the broadband networks. The video-conferencing and video-telephony are now becoming fundamental services over the Next Generation Network (NGN). Telecom operators in various countries pay much attention to this market opportunity. It can be anticipated that in the forthcoming years, the video communications services will become an important service growth point for telecom operators. A key point in developing such service is improving the end-to-end user experience—or so-called Quality of Experience. In the user experience, besides the Quality of Service (QoS) parameters of the network including packet loss, delay, jitter, R factor, etc., the Gamma nonlinearity issue caused by various elements, which leads to distortion of the luminance signal with respect to the video signal, is an important factor that may influence the final user experience. However, the method and technology for improving the end-to-end user experience at present mainly focus on the aspects such as assuring the network QoS and the pre-processing/post-processing relevant to the video compression encoding. With respect to the luminance distortion issue caused by the Gamma characteristics, neither sufficient attention is paid, nor has a systematic solution been developed. The seriousness of this issue is drawing attention of some large international telecom operators. France Telecom has recently put forward a suggestion to ITU-T that the influence of the Gamma characteristics upon the communications user experience should be considered in video communications, and such issue should be resolved.

In video communications, optical signal of the scenario (human beings, background, document, etc.) that needs to be transmitted enters a video recorder/camera in a video communications terminal (referred to as terminal hereinafter). The optical signal is transformed into a digital still image or video signal via A/D conversion and then compressed and encoded, and then transferred to a far-end terminal, where the digital still image or video signal is reconstructed again via decompression and displayed on a display device. Finally, the optical signal is to be perceived by human eyes. In this process, the luminance signal of the still image or video passes a plurality of elements. The luminance signal is a generalized luminance signal, i.e., signals in each phase, including the original optical signal, the electrical signal, and the digitized still image or video luminance/grey-scale signal, all contain information of the original luminance signal. Therefore, in a broad sense, it is the luminance signal that passes a plurality of elements.

As shown in FIG. 1, which is a schematic diagram showing a model of the Gamma characteristics of an element, the Gamma characteristics refer to that the input-output relation for the luminance signal of an element is not linear, i.e., there exists nonlinearity. The effect of the distortion caused by the Gamma nonlinearity of the element is as shown in FIG. 2. The luminance of the grey-scale blocks in the upper line increases linearly, i.e., from 0.1 to 1.0, whereas the luminance in the lower line is obtained after distortion of a Gamma nonlinear element, and the luminance increases according to a power function.

Practically, the Gamma nonlinearity may be caused by different reasons. For example, the Gamma characteristics of a Cathode Ray Tube (CRT) display device satisfy the following relation given by Equation 1 in an ideal situation:

$$L_{out}=L_{in}^{2.2} \quad (1)$$

Whereas the ideal Gamma of the corresponding video recorder/camera satisfy the relation given by Equation 2:

$$L_{out}=L_{in}^{0.45} \quad (2)$$

With respect to the origin of the Gamma issue, the Gamma issue is originated from the CRT display device, because the Gamma value of the CRT display device is 2.2. In order to compensate this nonlinearity, an artificial Gamma value of 0.45 is introduced in the video recorder. If there are only two Gamma elements in the system, i.e., the CRT display device and the video recorder, a complete Gamma correction may be realized. It should be noted that the input and output luminance signals are both normalized in their respective coordinate systems, i.e., $0 \le L_{out} \le 1$, $0 \le L_{in} \le 1$. For display device of other type, such as Liquid Crystal Display (LCD), either the form of the Gamma function may be different, or the parameters of the Gamma function may be different.

The model of the Gamma characteristics of a plurality of cascaded elements is as shown in FIG. 3. The total Gamma characteristics equal the composition of the Gamma function of each element, as given in Equation 3:

$$G_{CT}(\cdot)=G^{(1)}(\cdot) \circ G^{(2)}(\cdot) \circ G^{(3)}(\cdot) \ldots G^{(n-1)}(\cdot) \circ G^{(n)}(\cdot)$$
$$l_{out}=G_{CT}(l_{in})=G^{(n)}(G^{(n-1)}(G^{(n-2)}(\ldots G^{(2)}(G^{(1)}(l_{in}))))) \quad (3)$$

where "∘" represents composition operation of functions. CT represents Cascaded Total, i.e., the total Gamma of the cascaded elements.

In an ideal situation, from the optical signal entering the camera to the optical signal being output and displayed on the display finally, there exists a linear relation between input and output luminance signals, i.e., $L_{out}=L_{in}$, thus the scene perceived is the same as the original one, and the user may have the best experience.

In order to obtain the linear relation, a Gamma correction should be performed for the element with nonlinear Gamma characteristics. As shown in FIG. 4, the Gamma characteristics are specified for an element, and a further correction element may be cascaded thereafter, so that the total Gamma characteristics after cascading become a real linear relation, and the object of compensating the nonlinearity of the specified element may be achieved. The model of the correction element is the inverse model of the equivalent model of Gamma characteristics. If the equivalent model can be represented with a function, the function of the inverse model is the inverse function thereof. Obviously, $G_g(\cdot)$ and $G_c(\cdot)$ are mutually inverse functions. Normally, for a function, the inverse function thereof does not always exist (or even if the inverse function exists, the inverse function may not be obtained in a closed-form).

As shown in FIG. 5, in practical applications, the correction element usually needs to be inserted between two specified elements. At this time, the situation is more complicated with respect to $G_c(\cdot)$, because there exists no simple inverse function relation between $G_c(\cdot)$ and $G_a(\cdot)$ or between $G_c(\cdot)$ and $G_p(\cdot)$.

In a video communication, there is a plurality of cascaded elements within a terminal, and each element has Gamma characteristics. At present, there is no general method for implementing Gamma correction for processes from an optical signal entering a video recorder/camera until a display device displaying still image or video. Therefore, no general solution is provided for the video quality degradation caused by the Gamma issue. Meanwhile, the Gamma characteristic parameters of different terminals are unknown to each other. Thus, the issue of how to implementing Gamma correction after a video transferred from terminal A to terminal B is still not resolved. In a multiparty video communication, the situation is even more complicated, because a multipoint control unit (MCU) is involved, the MCU implements mixing for videos from a plurality of terminals, and then the mixed video is sent to each terminal. The Gamma characteristics of various sub-pictures in a multi-picture image may be different, so it is even more difficult to implement Gamma correction.

The main functions of the MCU include multipoint control (MC) and multipoint processing (MP). The MC includes communications process control and meeting control, etc. The MP includes media processing, video bit streams forwarding or multi-picture video/image synthesizing, audio mixing, etc. The MP function is mainly related to the present disclosure, and in a stricter sense, the video processing function of MP is mainly related to what? With respect to the video, the MCU may operate in following modes, and the former two situations are also referred to as a video forwarding mode.

1. Meeting Place Free View Mode

In this mode, each terminal that participates in a meeting can select freely to view the video of the meeting places of any other terminal. The MCU is responsible for forwarding the video of the terminal to be viewed to the receiving terminals. The number of terminals that can select to view other meeting places is determined by the maximum number of the freely viewable meeting places that can be supported by the MCU, where the maximum number depends on the capability of the device or the configuration of the operation control system. For example, terminal A may select to view the video of the meeting place of terminal B, and terminal B may select to view the video of the meeting place of terminal C, and so on.

2. Meeting Place Designated Viewing (i.e., Meeting Place Broadcast) Mode

A chairperson terminal (if available) in the meeting or a meeting organizer designates via the operation control system that the video of a terminal meeting place should be viewed by all the terminals in the meeting. The MCU is responsible for broadcasting the terminal video to be viewed, i.e., the video of the designated meeting place. For example, when terminal X is selected, all the other terminals will view the video of the meeting place of terminal X.

3. Multi-Picture Mode

The MCU combines videos of a plurality of terminal meeting places into a single multi-picture video. The layout of the multi-picture is specified by the meeting chairperson terminal (if available) or meeting organizer via the operation control system, where the layout of the multi-picture includes the number of the meeting places, the layout of the images of these meeting places, and the relative sizes of the images. If the selected terminal meeting places are $X_1, X_2, X_3, \ldots, X_C$, a possible layout is as shown in FIG. 6.

There are mainly two methods for synthesizing a multi-picture video by the MCU.

One method is a decoding-and-re-encoding synthesizing mode. The MCU first decompresses and decodes video bit-streams from various terminals, and restores the uncompressed digital video format. After that, the MCU assembles the images into a multi-picture video according to a specific multi-picture layout, and compresses and encodes the multi-picture video to obtain a new multi-picture video bit-stream.

The other method is a direct synthesizing method. The MCU synthesizes the video bit-streams from various terminals into a new bit-stream according to a grammar that complies with a standard. For example, in H.261, H.263 and H.264 protocols, such synthesization is allowed. In general, a problem that comes forth with the direct synthesization is that the terminal needs to decrease the resolution of the video image first. For example, the normal image is in a Common Interchange Format (CIF), the resolution needs to be decreased to ¼ of the original resolution, i.e., a quarter CIF (QCIF), so as to obtain a multi-picture with 4 sub-pictures (a layout of 2*2). In such situation, the image from the terminal is limited to be used for synthesization of the multi-picture video, and cannot be viewed by other terminals in a normal resolution. This limitation may not cause a serious problem in a specific application, and the advantages brought about by the direct synthesizing mode is apparent, i.e., the direct synthesization reduces the problem caused by decoding and recoding, such as requirement of high processing capability and deterioration of image quality, the cost of the MCU may be reduced, and the communication capacity and communication quality may be increased. Therefore, the direct synthesizing mode is widely employed.

Because the MCU needs to perform processing and computation, the number of terminals that can be controlled by an MCU is limited. In order to construct a larger communication network and to support more terminals, the manner as shown in FIG. 7 may be employed. In this manner, a plurality of MCUs are cascaded. For example, an MCU in the upper most layer controls MCU 2.1 to 2.m (totally m MCUs) in a lower second layer, and the MCUs in the lower second layer respectively control several MCUs (totally n MCUs) in the third layer. An MCU in a layer may control a number of terminals directly, or may control a number of terminals indirectly via an MCU in a lower layer that is controlled by the former MCU.

As shown in FIG. 8, the interior of an MCU may be decomposed as follows according to the function: a multipoint controller and a plurality of multipoint processors. Such decomposed model is very prevalent at present. In this way, implementation of the product may be more flexible, and more telecommunication devices of MCU type may be provided. The object of supporting the networking of a larger multimedia communication network may also be achieved by stacking a plurality of multipoint processors to enhance the processing capability.

The existing technologies are all based on the following hypotheses to perform Gamma correction on the terminal:

1. The display device and video recorder/camera of the terminal is designed and produced according to the standard requirements for the Gamma characteristics, i.e., the Gamma parameter of the display is 2.2, whereas the Gamma parameter of the video recorder/camera is 0.45.

2. There are no other Gamma elements between the video recorder/camera and the display device.

3. The data of the video bit-stream sent by the terminal is Gamma corrected, and such correction is implemented on the basis that the terminal can cooperate with the display device of a remote terminal.

Based on the above hypotheses, each terminal implements Gamma correction locally. The correction method is as shown in FIG. 4. The disadvantages of the existing correction method are apparent, because the three hypotheses required are even more difficult to be true at present. In the existing technologies, the high end video recorder is generally able to provide the Gamma correction function. However, much low-end camera cannot provide such function. If the video recorder can provide the Gamma correction function, it means that as a whole body, the Gamma characteristics of the video recorder as seen by an external device are given by Equation 2. However, in the practical situation, telecommunication operators are prompting public oriented video communications at present. Therefore, it is necessary to provide a very cheap terminal to attract the public. Thus, it is inevitable to employ cheap cameras. With respect to such cheap cameras, nonlinear Gamma characteristics may exist, but may not be in the form given by Equation 2, or even may not be in the form of a power function. According to practical test results, Gamma characteristics of a plurality of cheap cameras based on charge coupled device (CCD) are determined. The most approximate power function is $L_{out}=L_{in}^{0.22}$, and a lot of data points deviate from this curve, so it is hard to say that the Gamma characteristics is the curve of a power function. Furthermore, it is quite possible that other Gamma elements exist in a terminal system. Therefore, even if a camera has the standard Gamma characteristics given by Equation 2, the effect of a complete Gamma correction may not be achieved.

If a Gamma correction is to be performed, the Gamma characteristic parameters of the Gamma element need to be used. A high end device may has ideal Gamma characteristics, so the power function as defined by Equation 1 or 2 may be employed, where the power function includes a form of pure power function and a form of power function with offset. However, the Gamma characteristics of most middle end devices or low end devices can only be presented with a look-up table (LUT) as shown in FIG. 1.

Because the range of definition and range of values of the Gamma function are both the unit interval [0, 1], a discretization manner may be employed to represent such function relation. As shown in Table 1, the table has a form of two columns and N rows, where the left column includes N discrete values of $L_{in}$, and the right column includes the corresponding N discrete values of $L_{out}$. Therefore, when the corresponding $L_{out}$ is to be calculated according to the value of $L_{in}$, such calculation may be accomplished by looking up the table. If the value of $L_{in}$ is not included in the left column, an interpolation method may be employed to calculate the corresponding value of $L_{out}$.

TABLE 1

Representation method of Look-Up Table of Gamma parameters

| Discrete value of $L_{in}$ (input) | Corresponding value of $L_{out}$ (output) |
|---|---|
| $L_{in}(0)$ | $L_{out}(0)$ |
| $L_{in}(1)$ | $L_{out}(1)$ |
| $L_{in}(2)$ | $L_{out}(2)$ |
| ... | ... |
| $L_{in}(N-1)$ | $L_{out}(N-1)$ |

The two modes for representing the Gamma characteristic parameter have advantages and disadvantages respectively. The representation with function is concise, and only a few parameters need to be transferred. However, the calculation is complicated, and especially the calculation of a non-integer power of a floating point number may cost a lot of time. When the representation with a look-up table is employed, the calculation is simple, and this representation mode can be fit for any function form and have a good universality. However, the number of the parameters that need to be transferred is relatively large.

The ideal situation can hardly be obtained. Therefore, when the Gamma characteristics are represented in the form of pure power function or power function with an offset, the representation may be not precise in some situations. For example, if the camera is a cheap camera, the Gamma characteristics of the camera may not be in the form of power function. In this case, the representation with function is invalid. At present, telecommunication operators are prompting public oriented video communications. Therefore, it is necessary to provide a very cheap terminal to attract the public. Thus, it is inevitable to employ cheap cameras.

In the first prior art, the representation with function is not precise enough, and the situation is too much simplified and idealized. In a situation in which the requirements for the precision of the Gamma correction are not high, the representation with function may be employed for the purpose of simplification. However, for some application scenarios where the requirements for the quality is high, piecewise function models given by Equation 4 and Equation 5 may be employed:

$$L_{out} = \begin{cases} 0.45 L_{in} & \text{if } 0 \le L_{in} \le 0.081 \\ 1.099 L_{in}^{0.45} - 0.099 & \text{if } 0.081 < L_{in} \le 1 \end{cases} \quad (4)$$

$$L_{out} = \begin{cases} \frac{1}{0.45} L_{in} & \text{if } 0 \le L_{in} \le 0.081 \\ \frac{1}{1.099}(L_{in} + 0.099)^{2.2} & \text{if } 0.081 < L_{in} \le 1 \end{cases} \quad (5)$$

Where Equation 4 is a representation of Gamma characteristics of a video recorder, and Equation 5 is a representation of Gamma characteristics of a CRT display. Although the representation of the piecewise function is relatively precise, the application range is narrow. Such representation is only fit for a high end device (so called broadcast-class device) and cannot be well used by a lot of middle end devices and low end devices, especially a camera.

SUMMARY

The present disclosure provides a method for correcting Gamma characteristics of a video bit-stream in a video communication, and provides a multipoint control unit, to resolve the issue of Gamma distortion of the video image in the existing multimedia communication.

A method for correcting Gamma characteristics of a video bit-stream in a video communication, includes:

sending, by a transmitting terminal, the video bit-stream to a receiving terminal, the video bit-stream including video data generated according to a video image of the transmitting terminal, and further including Gamma characteristic parameter information of the transmitting terminal; and receiving, by the receiving terminal, the video bit-stream, restoring the video image according to the video data, and performing Gamma correction for the video image according to the Gamma characteristic parameter information of the receiving terminal and the Gamma characteristic parameter information of the transmitting terminal.

In the method, at lease one transmitting terminal sends the video bit-stream to a multipoint control unit, and the multipoint control unit sends the video bit-stream to the receiving terminal.

In the method, the multipoint control unit combines video bit-streams from at least two transmitting terminals into a multi-picture video bit-stream, and sends the multi-picture video bit-stream to the receiving terminal.

In the method, the multipoint control unit restores the video image according to the video data of each transmitting terminal, takes the video image as a sub-picture respectively and assembles sub-pictures into a multi-picture image, generates the video data of the multi-picture image, and combines the video data of the multi-picture image and the Gamma characteristic parameter information corresponding to each sub-picture into a multi-picture video bit-stream, and sends the multi-picture video bit-stream to the receiving terminal. A sequence of the Gamma characteristic parameter information of the sub-pictures is determined according to assembling positions and a sequence of the sub-pictures; and the receiving terminal restores the multi-picture image according to the video data of the multi-picture image, and corrects the video image of each sub-picture according to the Gamma characteristic parameter information of the receiving terminal and the Gamma characteristic parameters corresponding to each sub-picture.

In the method, the multipoint control unit extracts the video data in the video bit-stream from each transmitting terminal, performs composition directly according to an assembling sequence of the sub-pictures, and then combines the composed video data and the Gamma characteristic parameter information corresponding to each sub-picture into a multi-picture video bit-stream, and sends the multi-picture video bit-stream to the receiving terminal. The sequence of the Gamma characteristic parameter information of the sub-pictures is determined according to assembling positions and a sequence of the sub-pictures; and the receiving terminal extracts the video data corresponding to each sub-picture from the composed video data, restores the video image of each sub-picture, and corrects the video image of each sub-picture according to the Gamma characteristic parameter information of the receiving terminal and the Gamma characteristic parameters corresponding to each sub-picture, and then assembles the sub-pictures corrected into a multi-picture image according to the assembling sequence.

Indication information for identifying whether a Gamma distortion exists in the video image is set in the video bit-stream, and the receiving terminal determines whether the multi-picture video bit-stream carries the Gamma characteristic parameter information according to the indication information.

The present disclosure further provides a method for correcting Gamma characteristics of a video bit-stream in a video communication, including:

sending, by a video bit-stream transmitting terminal, a first video bit-stream to a multipoint control unit, the first video bit-stream including video data generated according to a video image of the transmitting terminal and Gamma characteristic parameter information of the transmitting terminal;

receiving, by the multipoint control unit, the first video bit-stream, restoring the video image according to the video data, and performing a one-time Gamma correction for the video image according to the Gamma characteristic parameter information of the transmitting terminal; and generating video data of the video image that is one-time corrected, putting the video data generated into a second video bit-stream, and sending the second video bit-stream to a receiving terminal.

The method further includes: receiving, by the receiving terminal, the second video bit-stream, restoring the video image that is corrected, and performing correction again according to the Gamma characteristic parameters of the receiving terminal.

In the method, the multipoint control unit corrects respectively the video images of the first video bit-streams from at least two transmitting terminals, and assembles the video images into a multi-picture image, and video data of the multi-picture image are generated according to the multi-picture image, and carried in the second video bit-stream and sent to the receiving terminal.

In the method, the receiving terminal restores the multi-picture image according to the video data of the multi-picture image, and corrects the video image of each sub-picture again according to the Gamma characteristic parameters of the receiving terminal.

First indication information for identifying whether a Gamma distortion exists in the video image is set in the first video bit-stream, and/or a second indication information for identifying that a one-time correction has been performed on the video image is set in the second video bit-stream.

The multipoint control unit determines that the Gamma characteristic parameter information of the transmitting terminal is carried in the first video bit-stream according to the first indication information.

The Gamma characteristic parameter information of the transmitting terminal includes: the Gamma characteristic parameters of each Gamma characteristic element passed by the video image in the transmitting terminal during processes of collecting and processing of the video image as well as forming the video bit-stream, and a cascading sequence of each Gamma characteristic element; or equivalent Gamma characteristic parameters determined by the transmitting terminal according to all the Gamma characteristic elements that are passed.

In the method, the transmitting terminal puts the video data of each video image corresponding to the Gamma characteristic parameter information of the video image into the video bit-stream, and sends the video bit-stream to the receiving terminal; or the transmitting terminal puts the Gamma characteristic parameter information into the video bit-stream and sends the video bit-stream to the receiving terminal with a certain period; or the transmitting terminal puts initial Gamma characteristic parameter information into the video bit-stream at the beginning of the communication, and sends the video bit-stream to the receiving terminal; and puts updated Gamma characteristic parameter information into the video bit-stream and sends the video bit-stream to the receiving terminal when local Gamma characteristic parameters are changed during the communication.

The Gamma characteristic parameters of each Gamma element or the equivalent Gamma characteristic parameters include a set of output luminance values corresponding to each level of input luminance signal values of preconfigured levels. The preconfigured levels of the input luminance signal values comprise level 0-255, and the luminance value is an integer.

According to the method, a Gamma parameter information area is extended in the video bit-stream, a set of the input luminance signal values and/or a set of output luminance signal values form/forms a binary bit-stream, and are/is carried in the Gamma parameter information area for transmission.

In the method, the Gamma parameter information area respectively includes the Gamma parameter information and a start delimiter and an end delimiter locating at both ends of the Gamma parameter information. The start delimiter and the end delimiter are adapted to determine the range of the information area.

When an H.264 protocol encoding is employed in the video bit-stream, a message for carrying the Gamma parameter information is extended in a Supplement Enhancement Information area of an H.264 bit-stream.

The present disclosure further provides a multipoint control unit, including a multipoint processor. The multipoint processor includes:

a Gamma characteristic parameter storing module, adapted to store Gamma characteristic parameters of a video image transmitting terminal; and a Gamma characteristic correcting module connected with the Gamma characteristic parameter storing module and adapted to correct Gamma characteristics in the video image according to the Gamma characteristic parameters of the video image transmitting terminal.

The multipoint processor further includes:

a video bit-stream transmitting and receiving module, adapted to transmit and receive the video bit-stream, the video bit-stream including video image data and the Gamma characteristic parameter information of the video bit-stream transmitting terminal; and a video data encoding/decoding module connected between the video image transmitting and receiving module and the Gamma characteristics correcting module and adapted to decode the video data from the video bit-stream and input the decoded data into the Gamma characteristics correcting module for correction, or adapted to encode the video data based on the corrected video image.

A Gamma characteristic parameter information extracting/adding module connected between the video bit-stream transmitting and receiving module and the video data encoding/decoding module is adapted to extract the Gamma characteristic parameter information of the transmitting terminal from the received video bit-stream, and store the Gamma characteristic parameter information into the Gamma characteristic parameter storing module, or is adapted to extract the Gamma characteristic parameter information from the Gamma characteristic parameter storing module, and add the Gamma characteristic parameter information to the video bit-stream to be transmitted.

A multi-picture assembling module connected with the Gamma characteristics correcting module is adapted to assemble the received video images of at least two terminals into a multi-picture video, and input the multi-picture video into the video data encoding/decoding module or the Gamma characteristic parameter information extracting/adding module.

The Gamma characteristics correcting module includes:

an equivalent Gamma characteristic parameter calculating sub-module adapted to calculate equivalent Gamma characteristic parameters according to characteristic parameters of a single Gamma element of the transmitting terminal, and input the equivalent Gamma characteristic parameters into a Gamma correction generating sub-module;

a Gamma correction generating sub-module adapted to correct the Gamma characteristics of the video image according to the equivalent Gamma characteristic parameters.

The multipoint control unit further includes: a multipoint controller connected with the multipoint processor, adapted to send a control signal of performing Gamma characteristic correction to the multipoint processor.

According to the present disclosure, a plurality of multipoint processors is arranged in parallel.

The beneficial effects of the present disclosure is as follows:

In the method according to the present disclosure, the Gamma characteristic parameters of the transmitting terminal are carried in the video bit-stream, and the receiving terminal performs a correction for the received video image according to the Gamma characteristic parameters of the transmitting terminal and the Gamma characteristic parameters of the receiving terminal. Or after the multipoint control unit performs a correction for the video image according to the Gamma characteristic parameters of the transmitting terminal, the receiving terminal performs a correction again according to the Gamma characteristic parameters of the receiving terminal, so that the Gamma distortion in the video image may be corrected in the receiving terminal. The method according to the present disclosure is applicable for various scenarios in the video communication, so that the Gamma correction is implemented in the multimedia communication, and the quality of the communication and user experience may be improved.

The present disclosure further provides a multipoint control unit with a Gamma characteristics correcting function to implement the method according to the disclosure. This multipoint control unit may perform correction for the forwarded video image according to control instructions or further forwards the video image, and the multipoint control unit is compatible with the existing direct forwarding function.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
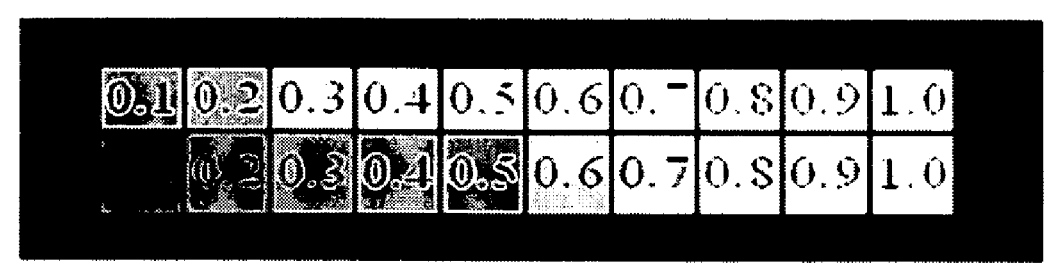

FIG. 2 is a schematic diagram showing the distortion of the luminance signal caused by the Gamma characteristics of an element;

Figure 6:
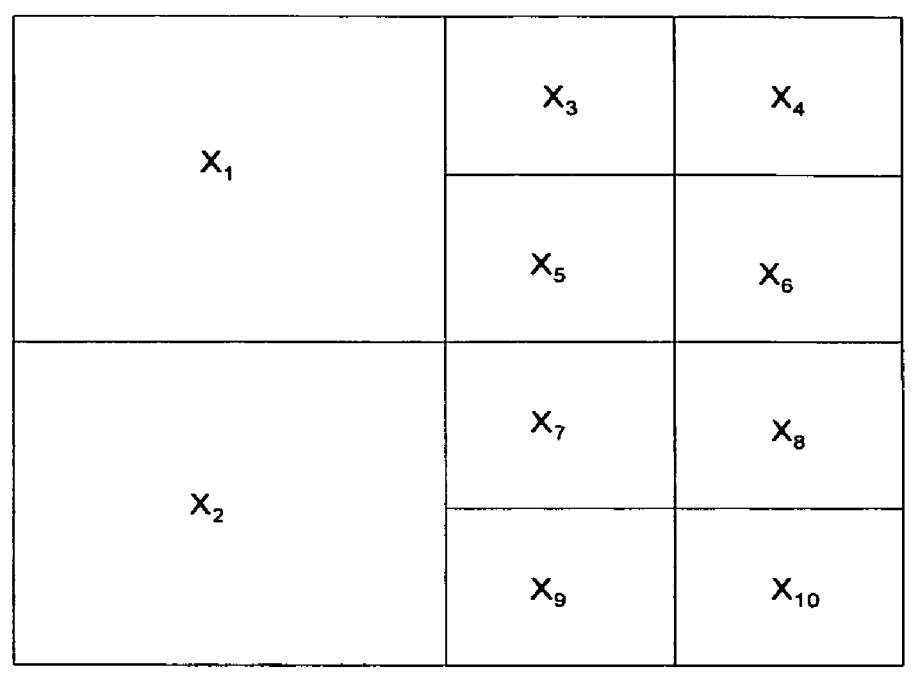

FIG. 6 is an example of a multi-picture layout;

DETAILED DESCRIPTION

The following description is merely exemplary in nature and is not intended to limit the present disclosure, application, or uses.

Figure 9:
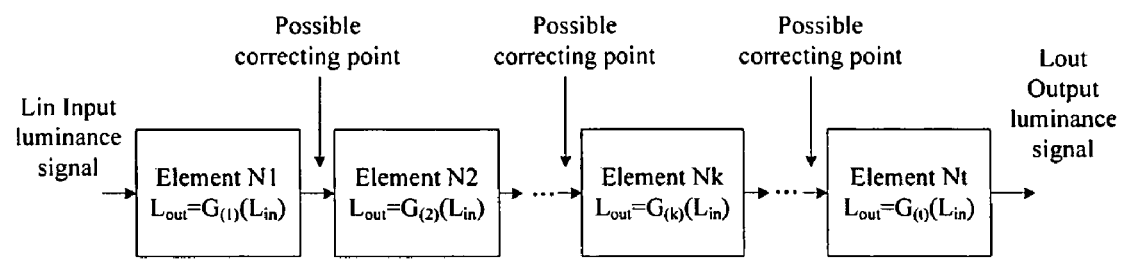
FIG. 9 is a schematic diagram showing possible correction points when a plurality of Gamma elements are cascaded.
Figure 10:
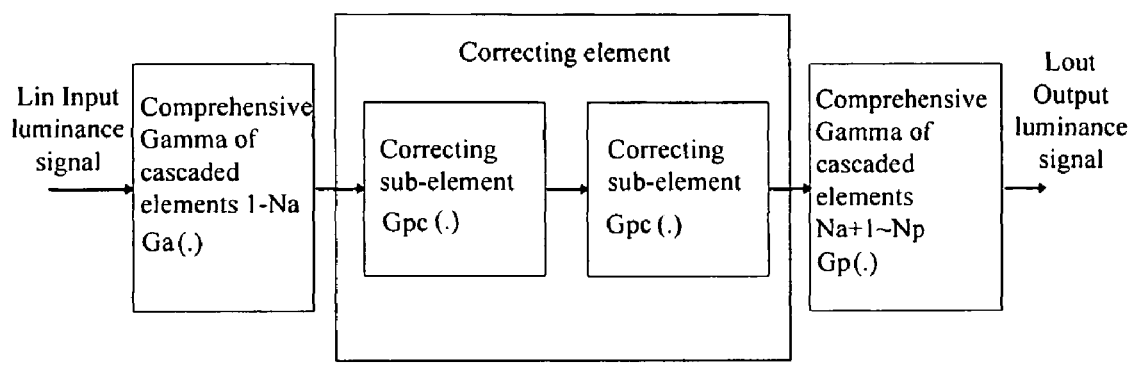
FIG. 10 is a schematic diagram showing a general method for correcting Gamma characteristics when a plurality of Gamma elements are cascaded.

As the basis for implementing the present disclosure, a general method in which a Gamma path is utilized to correct the Gamma characteristics of a plurality of elements is first introduced. As shown in FIG. 9, assuming that the Gamma path passed by a video signal from collection to output includes $N_t$ cascaded Gamma elements. A correction point may be inserted between any two elements. The correction element divides the Gamma path passed by an image into two segments. The segment before the correction point includes $N_a$ elements, and the segment after the correction point includes $N_p$ elements. As shown in FIG. 10, the comprehensive equivalent Gamma characteristics of $N_a$ elements and $N_p$ elements are first determined respectively. Then the correction sub-elements of the equivalent Gamma characteristics are constituted respectively. After that, composition is performed on the two correction sub-elements, and the correction point is inserted. The correction element is actually a composition of the two correction sub-elements. Specifically, the composition includes:

1. determining a cascading path of Gamma characteristic elements relevant to a signal, where the number of elements contained in this cascading path is $N_t$;

2. determining a correction point in the cascading path while this correction point divides the $N_t$ elements into two parts: $N_a$ elements cascaded before the correction point and $N_p$ elements cascaded after the correction point, where $N_a \geq 0$, $N_p \geq 0$, and $N_a + N_p = N_t$;

3. establishing a first comprehensive equivalent model for the $N_a$ elements and a second comprehensive equivalent model for the $N_p$ elements according to a Gamma characteristics equivalent model of each element and parameters of the Gamma characteristics equivalent model;

4. determining a first inverse model of the first comprehensive equivalent model and a second inverse model of the second comprehensive equivalent model;

5. establishing a correction element model according to the first inverse model and the second inverse model, determining a correcting signal for a final output signal of the $N_a$ elements with the correction element model, and inputting the correcting signal into the $N_p$ elements.

According to this method, the following methods may be adopted for establishing the correction element model:

Direct calculation method, in which the correcting signal for the final output signal of the $N_a$ elements is calculated in real time with a composition function constituted with the function of the first inverse model and that of the second inverse model;

Two-step calculation method, in which a one-time correcting signal for the final output signal of the $N_a$ elements is calculated in real time with the function of the first inverse model, then a second correcting signal of the first correcting signal is calculated with the function of the second inverse model, and the second correcting signal is used as the correcting signal; and Look-up table method, in which correction values corresponding to a plurality of sample values in the range of the final output values of the $N_a$ elements are calculated in advance according to the direct calculation method or the two-step calculation method, and the correspondence relation is saved in a data table. The correction value for any value to be corrected may be obtained via querying the data table in real time.

For a model in which the data table is adopted, there is no analytic form for the equivalent model itself (for example, when the model is realized with the look-up table method, the inverse function thereof certainly does not have an analytic form), then the inverse model is an inverse table of the data table. A table includes two columns and several rows. The left column (input column) contains sample values of the input signal, i.e., signal values to be corrected, and the right column (output column) contains corresponding output signal values, i.e., corrected signal values. The number of the row depends on the number of sampling points. The larger the number of the rows is, the more precise the sampling is. The inverse table is a new data table obtained by exchanging the left and the right columns. For video data containing a large data volume, the load of performing real time calculation is very heavy. Therefore, the look-up table method is the most practical way.

The premise for using the method described above is that the terminal should be able to determine all the Gamma characteristic elements on this terminal itself. When the equivalent model is represented in a function, the transmitting terminal or receiving terminal determines respectively the equivalent model or parameters of the equivalent model for each Gamma characteristic element on the transmitting terminal or receiving terminal itself via steps described in the following, or determines directly the comprehensive equivalent model and parameters of the equivalent model for a plurality of cascaded Gamma characteristic elements.

The present disclosure further introduces a method for determining the equivalent model of each Gamma characteristics element and for detecting the parameters of the equivalent model. The method includes the following steps:

First, a set of general equivalent models of the Gamma characteristics of an individual element is selected. For example:

The first Gamma model satisfies Equation 6:

$$L_{out} = pL_{in}^{\alpha} + (1-p) \quad 0 \leq p \leq 1, \alpha \geq 1 \qquad (6)$$

The domain of definition, i.e., the value range of independent variables, of the function represented by Equation 6 is interval [0, 1], and the range of values, i.e., the range of function values, is interval [(1-p), 1].

The second Gamma model satisfies Equation 7:

$$L_{out} = (qL_{in} + (1-q))^{\frac{1}{\beta}} \quad q \geq 1, \beta \geq 1 \tag{7}$$

The domain of definition, i.e., the value range of the independent variables, of the function represented by Equation 7 is range [1−1/q, 1], and the range of values, i.e., the value range of the function values, is range [0, 1].

After that, one model selected from above is taken as the model to be identified, and the following steps are performed:

1. For the input luminance signal $L_{in}$, N sampling points with an uniform interval are selected in the range [0, 1]: $L_{in}(0), L_{in}(1), L_{in}(2) \ldots L_{in}(i) \ldots L_{in}(N-2), L_{in}(N-1)$;

2. The N sample values of the luminance signal are respectively input into the elements, and N corresponding values of the luminance signal that are actually output are measured: $L^P_{out}(0), L^P_{out}(1), L^P_{out}(2) \ldots L^P_{out}(i) \ldots L^P_{out}(N-2), L^P_{out}(N-1)$;

3. A fitting object function is constructed. The object function is relevant to the difference between the output luminance signal actually identified and the theoretical output luminance signal determined through the Gamma characteristic model. The smaller the difference is, the better the equivalent effect of the model fits the practical situation.

There is a plurality of methods for constructing the object function. The following Equation 8 or Equation 9 is usually used:

$$F_{T1}(p, \alpha) = \sum_{i=0}^{N-1} (L^P_{out}(i) - pL_{in}(i)^\alpha - (1-p))^2 \text{ or,} \tag{8}$$

$$F_{T2}(q, \beta) = \sum_{i=0}^{N-1} \left(L^P_{out}(i) - (qL_{in}(i) + (1-q))^{\frac{1}{\beta}}\right)^2 \tag{9}$$

4. The threshold T of the value of the object function and the maximum iteration number M are configured, and a mathematical optimum method is adopted to find the most suitable parameter set.

First, for the first cost function $$F_{T1}(p, \alpha) = \sum_{i=0}^{N-1} (L^P_{out}(i) - pL_{in}(i)^\alpha - (1-p))^2,$$

a mathematical optimization technique is adopted for obtaining the minimum value, such as hill climbing method, 0.618 method (or also known as Hua Luogeng optimization method), steepest descent method or conjugate gradient method.

Actually, this process is an iterative process. During the process, parameters p and α are adjusted continuously, and the function value decreases continuously. When the function value decreases to be smaller than the given threshold T, it is considered that the minimum point is found. The corresponding parameters p and α at this time are considered to be the real parameters of the model for the current application environment.

When after M iterations, the function value of $$F_{T1}(p, \alpha) = \sum_{i=0}^{N-1} (L^P_{out}(i) - pL_{in}(i)^\alpha - (1-p))^2$$

still cannot be smaller than the threshold T, it is considered that the model is not selected correctly, and the second model should be used. Therefore, the above step 4 is repeated for $$F_{T2}(q, \beta) = \sum_{i=0}^{N-1} \left(L^P_{out}(i) - (qL_{in}(i) + (1-q))^{\frac{1}{\beta}}\right)^2,$$

and the corresponding model parameters q and β are obtained. It should be noted that the value ranges of the parameters q and β are q≧1 and β≧1 respectively.

When more precise parameters are to be obtained, more iterations may be performed after the value of the object function F falls below the threshold T. The value of the object function F may decrease continuously, decrease first and then increase, or increase directly. No matter how the value of the object function F varies, parameters corresponding to the minimum values are selected to be the measurement result. Thus, the precision of the parameter measurement may be increased to a certain extent.

Therefore, the determination of the model type and the measurement of the parameters are performed simultaneously. In practice, there are not only two forms with respect to the type of the equivalent model. With the method described above, the most suitable model may be found in all the relevant equivalent models via measuring the parameters.

Similarly, the above method may be employed to measure the comprehensive Gamma characteristic model of a plurality of elements and parameters of the comprehensive Gamma characteristic model. The processes of the method for measurement are totally the same. It should be pointed out that the form of the function of the comprehensive Gamma characteristic model for a plurality of cascaded Gamma elements may still be classified into two types as represented by Equation 6 and Equation 7. However, for the comprehensive characteristic model of the first type, the value range of the exponent a becomes α>0 according to the result of the qualitative analysis and the empiric value obtained from actual measurement. Whereas in the comprehensive characteristic model of the second type, the value range of the exponent β becomes β>0.

Figure 4:
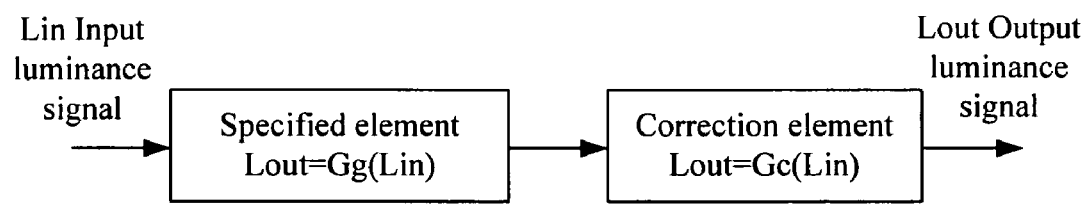
FIG. 4 is a schematic diagram showing the correction of the Gamma characteristics of a single element.
Figure 5:
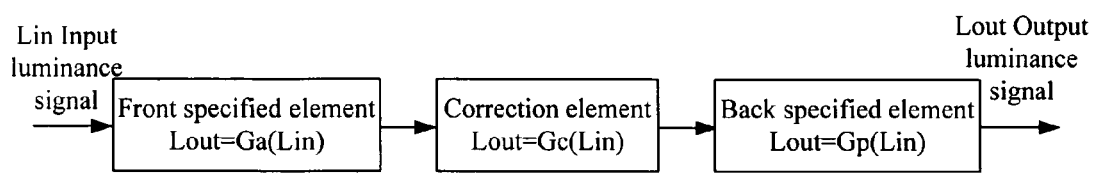
FIG. 5 is a schematic diagram showing the correction of the Gamma characteristics of a plurality of given elements.
Figure 7:
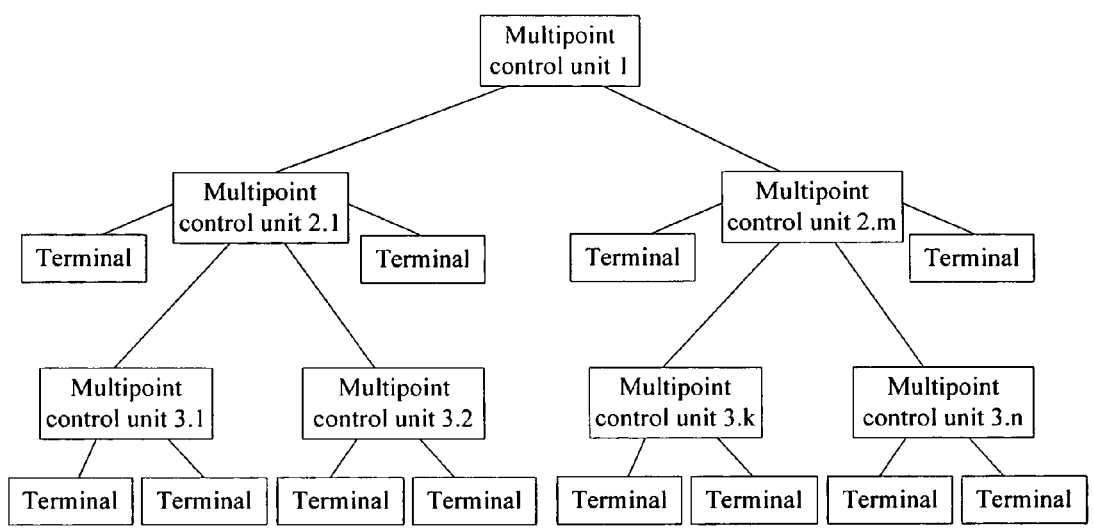
FIG. 7 is a schematic diagram showing the enhancement of the control function of MCU through cascading.
Figure 8:
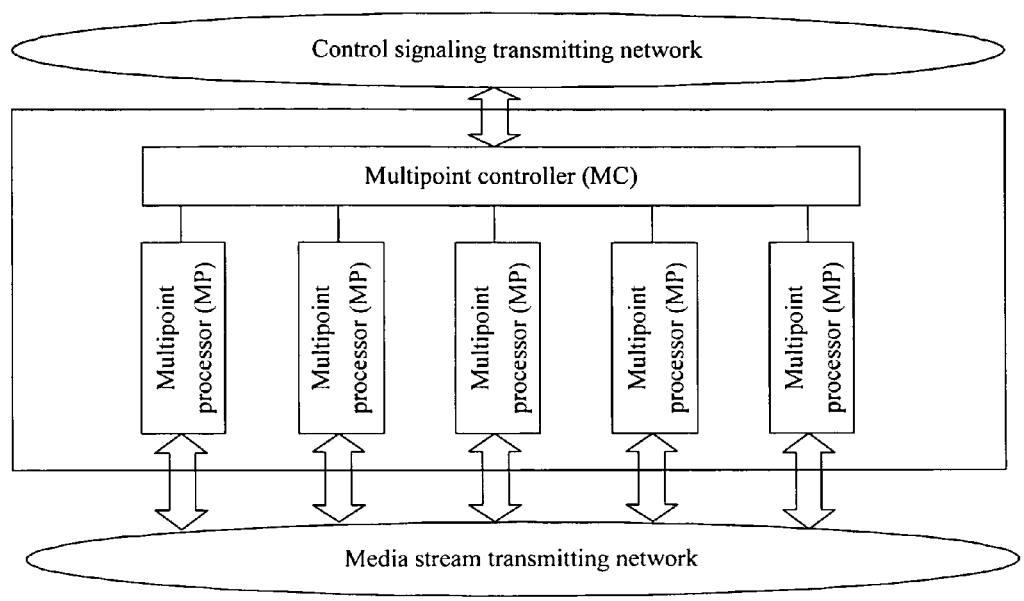
FIG. 8 is a schematic diagram showing the structure of an existing MCU.

Therefore, when the Gamma characteristic model and parameters thereof are determined, the correction model may be determined according to the above method. As shown in FIG. 4, for a single given element, Gc(·) may be found to perform Gamma correction for Gg(·) as long as Gg(·) satisfies a certain condition. As shown in FIG. 5, for a plurality of given elements, Gc(·) may be found to perform Gamma correction for Ga(·) and Gp(·) as long as Ga(·) and Gp(·) satisfy certain conditions.

Figure 1:
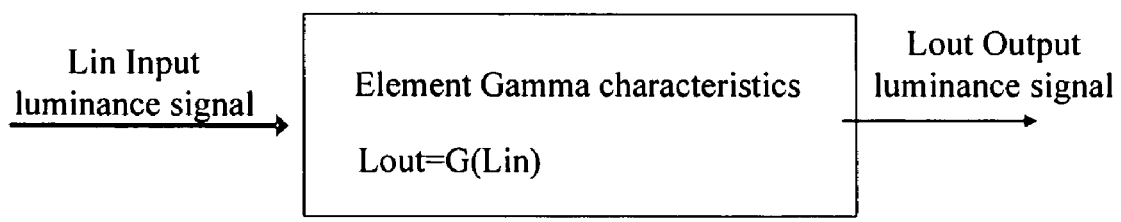
FIG. 1 is a general model of Gamma characteristics of an element.
Figure 3:
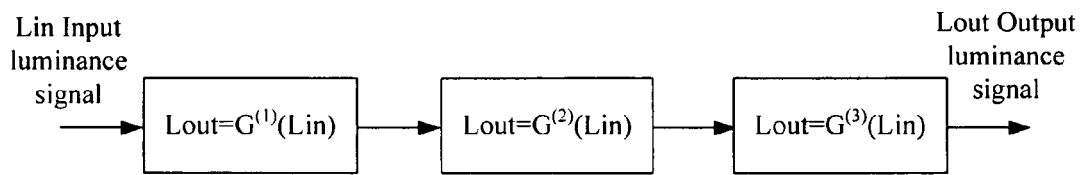
FIG. 3 is a general model of the Gamma characteristics of several cascaded elements.

For a multimedia communication terminal, the external optical signal may enter a video recorder/camera, be processed by different elements, and finally reach a local display and be converted to the optical signal. Or the external signal may pass a compression and encoding element, be transferred via a communication network, and reach a remote terminal, where the signal may be decompressed and decoded, and the image may be retrieved again. The image may be displayed on terminal displays of several parties, i.e., converted to the optical signal. Or the optical signal may be input via video recorder/camera, converted to an electrical signal, written to a file after a processing, and saved in a storage device such as hard disc. The path passed by a video signal may be regarded as the Gamma path as shown in FIG. 3, and the above general method may be employed for correcting the Gamma characteristics.

Based on the above detecting method for determining the equivalent model of each Gamma characteristics element and parameters thereof, each terminal may be able to detect the equivalent model of respective local Gamma element and parameters thereof. Thus, the present disclosure provides the following technical solution:

1. A mechanism for transfer and exchange of Gamma characteristic parameters may be provided in a video bit-stream encoding and compression protocol or a video bit-stream transfer bearing protocol.

Specifically, the single element Gamma characteristic parameters of each Gamma characteristic element as well as the cascading sequence of each Gamma characteristic element passed by the video image are carried in the video bit-stream and sent by a transmitting terminal. Alternatively, the equivalent Gamma characteristic parameters are calculated by the transmitting terminal according to all the Gamma characteristic elements passed by the video image, and then carried in the video stream for transmission.

The transmitting terminal may make the information of the corresponding Gamma characteristic parameters carried for each video image; or the transmitting terminal may make the information of the Gamma characteristic parameters carried in the video bit-stream and send the video bit-stream to a receiving terminal with a certain period, where the period may be measured with respect to time, or may be measured with respect to the frame of the image; or the initial Gamma characteristic parameter may be carried in the video bit-stream at the beginning of the communication and sent to the receiving terminal, and the updated information of the Gamma characteristic parameters may be carried in the video bit-stream and sent to the receiving terminal when the local Gamma characteristic parameters are changed during the communication.

2. Based on 1, on the basis of the exchange of the Gamma characteristic parameters, the above general correction method is employed for correction. The correction may be performed in a multipoint control unit or a multipoint communication server with a similar function, or the correction may be performed by a video data receiving terminal. Therefore, this solution is also suitable for the case of two-point communication, or the case of multipoint communication without participation of the multipoint control unit.

This solution is also suitable for the following two main operation modes of the multipoint control unit:

1) Multi-picture mode: the multi-picture mode includes a composition mode, in which a decoding is first performed, and then an encoding is performed, and a direct composition mode, i.e., so called software multi-picture;

2) Video forwarding mode.

Furthermore, this solution is suitable for the case in which a plurality of multipoint control units is cascaded as well as for the case in which the MC and MP of the multipoint control unit are separated.

In order to facilitate the description, following conceptions are defined in the present disclosure:

1. Gamma distortion: Gamma is a non-linear distortion (or so called deformation), which refers to that a signal is affected by one or more Gamma elements successively and suffered from a Gamma distortion.

2. No Gamma distortion: The signal is in status where no Gamma distortion exists.

3. Complete Gamma correction status: After a Gamma correction, the signal with Gamma distortion reaches a status that is the same as the no Gamma distortion status. This status is referred to as the complete Gamma correction status.

4. Gamma track: The Gamma track is adapted to carry and transfer the data part of the Gamma information in the video bit-stream.

It should be noted that the above definitions are based on ideal situations. Practically, the correction of the video image can only be regarded as an approximate no Gamma distortion status or an approximate complete Gamma correction status.

Hereinafter, a detailed illustration will be made with specific various embodiments.

Embodiment I: Gamma Correction in the Meeting Place Freely Viewing Mode

In this situation, the MCU does not process the video bit-stream from the terminal, but only forwards the video bit-stream. Assuming that terminal A selects to freely viewing the video of terminal B, then after terminal B joins the video conference, terminal B sends the local video bit-stream to the MCU, the video bit-stream carrying Gamma characteristic parameters of terminal B. It is assumed that terminal B has $N_B$ Gamma elements. The MCU forwards the video bit-stream from terminal B to terminal A.

Figure 11:
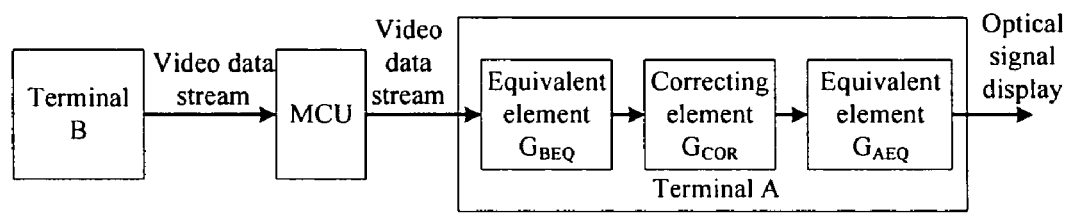
FIG. 11 is a schematic diagram showing the principle of the method for Gamma correction in the meeting place freely viewing mode according to a first embodiment of the present disclosure.

Terminal A receives and analyzes the video bit-stream from terminal B, extracts the carried Gamma characteristic parameters and digital video data from the video bit-stream, and performs correction in combination with the Gamma characteristic parameters of terminal A itself. The specific correction method is the above general correction method. The correction principle is as shown in FIG. 11, and the correction procedure includes following processes:

1. Terminal A obtains the digital video data from the video bit-stream of terminal B via decompression and decoding.

2. Terminal A extracts the Gamma parameters of $N_B$ Gamma elements from the video bit-stream of terminal B.

3. Terminal A calculates the Gamma parameters of the equivalent Gamma element $G_{BEQ}$ that is formed by cascading $N_B$ Gamma elements according to Equation 3, where EQ represents Equivalent.

Meanwhile, terminal A calculates the Gamma parameters of the equivalent element $G_{AEQ}$ of a plurality of local Gamma elements according to Equation 3.

4. Terminal A calculates the Gamma parameters of the correction element $G_{Cor}$ based on $G_{BEQ}$ and $G_{AEQ}$.

5. Terminal A corrects the video from terminal B based on the Gamma parameters of $G_{Cor}$, and then performs displaying via a local display.

The specific correction may employ the direct calculation method based on the function representation, or the look-up table method based on the look-up table. For the detailed situation, reference may be made to the above general correction method, which will not be described again here.

In the above various embodiments, if a direct communication is performed between terminal A and terminal B, or if no MCU exists in the current communication system, terminal A and terminal B exchange the video data stream with each other directly.

Embodiment II: Gamma Correction in the Meeting Place Designated Viewing (i.e., Meeting Place Broadcast) Mode Same as in embodiment 1, the MCU only broadcasts the video bit-stream from a designated terminal to be viewed to all the terminals participating in the meeting, and no other processing is performed.

Figure 12:
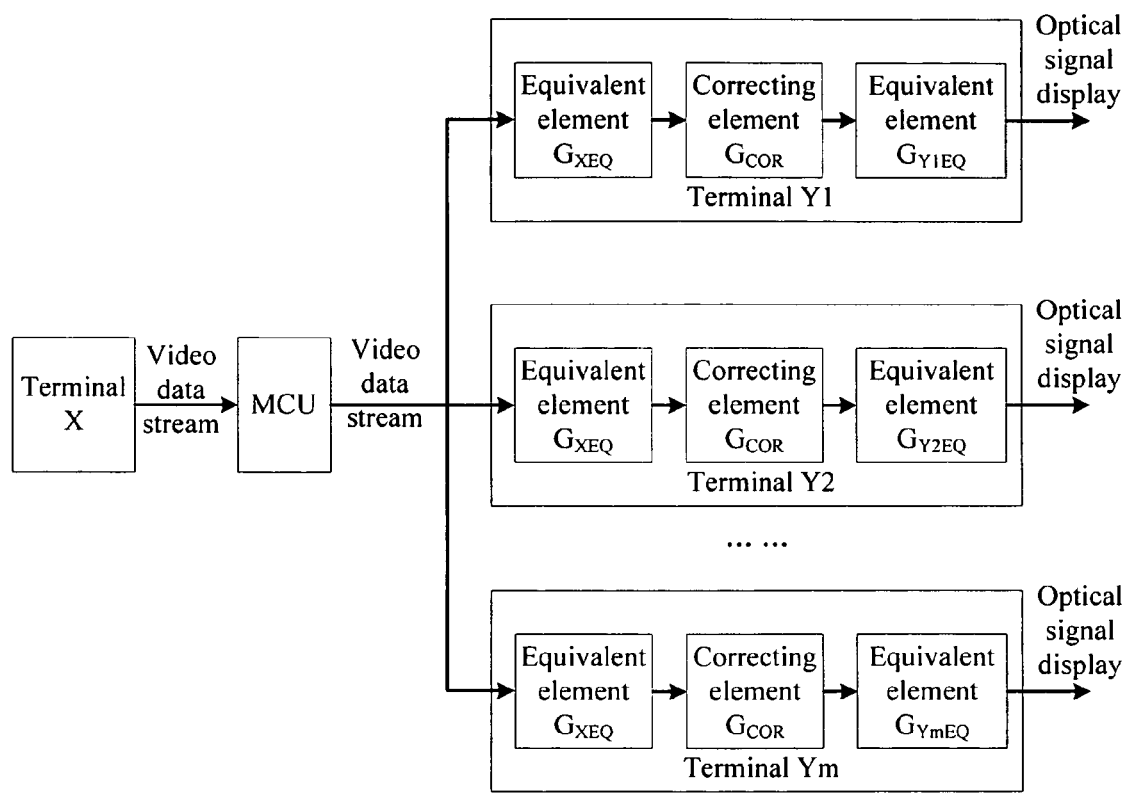
FIG. 12 is a schematic diagram showing the principle of the method for Gamma correction in the meeting place designated viewing (i.e., meeting place broadcasting) mode according to a second embodiment of the present disclosure.

As shown in FIG. 12, it is assumed that the meeting place terminal that is broadcast is X, and the video of X is received by other terminals. Any one of other terminals Y1, Y2, ..., Ym needs to extract the Gamma parameters according to the Gamma parameter information carried by the video bit-stream from X, and then perform correction. The processes of the correction are the same as described in Embodiment I.

The difference with respect to Embodiment I lies in that when the terminals viewing the video of terminal X perform correction synchronistically and receive the video, the Gamma correction in the meeting place designated viewing (i.e., meeting place broadcast) mode is implemented.

Figure 13:
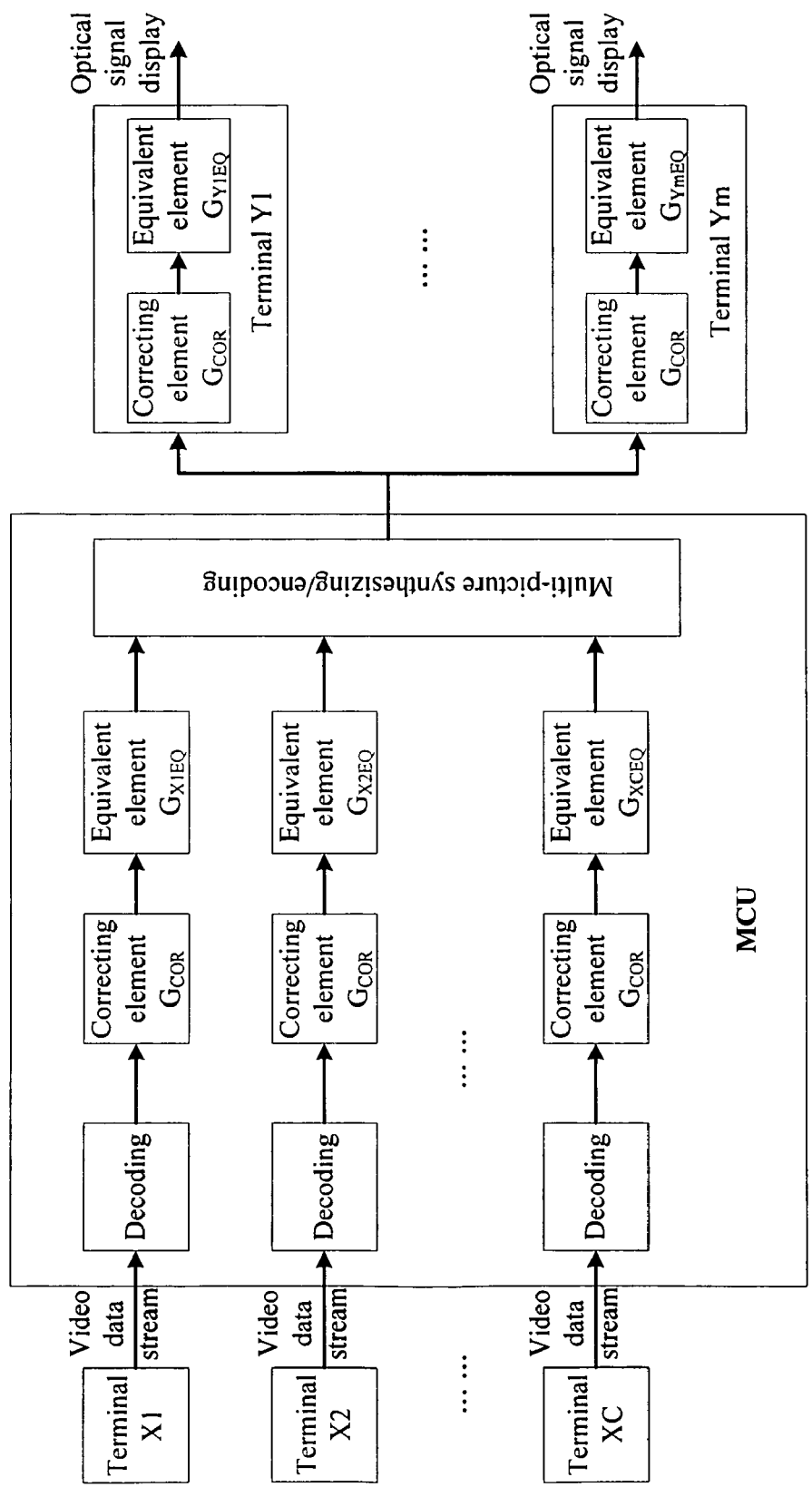
FIG. 13 is a schematic diagram showing the principle of performing decoding and then encoding and synthesizing for video images to obtain multi-picture video by MCU according to a third embodiment of the present disclosure, when Gamma correction is performed in the multi-picture mode.

Embodiment III: Multi-Picture Mode, a First Gamma Correction Method when the MCU Operates in the Composition Mode, in which a Decoding is First Performed, and then an Encoding is Performed As shown in FIG. 13, the MCU first needs to perform decompression and decoding for C sub-picture videos from terminals $X_1, X_2, \ldots X_C$ (C refers to the total number of sub-pictures in a multi-picture layout), restore the uncompressed digital video format, assemble the sub-pictures to form a multi-picture image, and then perform encoding and compression. In this process, the MCU may perform processing and Gamma characteristic correction for the uncompressed digital video format that is restored. The specific procedure is as follows:

1. The MCU performs decompression and decoding for the video from terminal Xi ($1 \leq i \leq C$) to form the uncompressed digital video format.

2. The MCU extracts the carried Gamma parameter information from the video bit-stream from Xi.

3. The MCU forms an equivalent element $G^{(i)}_{XEQ}$ according to a cascading principle on the basis of the Gamma parameters obtained through extraction, and calculates the corresponding Gamma characteristic parameters.

4. The MCU performs correction according to the $G^{(i)}_{XEQ}$ and corresponding Gamma characteristic parameters and obtains the result of the correction, so that a complete correction status is formed. In other words, the corrected video is in a non Gamma distortion status.

The MCU repeats the above processes 1-4, until the videos from C terminals are corrected.

5. The MCU assembles C sub-pictures according to the designated multi-picture layout, and obtains a multi-picture image.

6. The MCU performs compression and encoding for the multi-picture image obtained.

7. The MCU fills Gamma track information that carries the Gamma information for the multi-picture video bit-stream that is newly generated.

At this point, because each sub-picture of the multi-picture is free from Gamma distortion, the whole multi-picture video is free from Gamma distortion. Therefore, the Gamma track practically does not include any Gamma parameter. However, it is required to set a correction flag in the Gamma track to indicate whether the video is free from Gamma distortion. There are several methods for setting the flag. For example, when a correction flag is set, it is indicated that Gamma distortion exists in the video bit-stream, and when the correction flag is not set, it is indicated that no Gamma distortion exists. Or when the correction flag is set to be 1, it is indicated that Gamma distortion exists, and when the correction flag is set to be 0, it is indicated that no Gamma distortion exists. It is apparent that this flag needs to be located at the beginning of the Gamma track. Thus, when the MCU or terminal reads the flag, a determination is first performed with respect to the correction flag. When there is no Gamma distortion, it means that there is no Gamma parameter after the flag, so it is not necessary to go on reading data. When there is a Gamma distortion, it is required to go on reading data.

8. The MCU sends the newly generated multi-picture video bit-stream to a plurality of terminals.

For the plurality of terminals that receive the multi-picture video bit-stream, the processing procedures on terminals are the same. As shown in FIG. 13, the specific procedure is as follows:

1. Terminal Y calculates the Gamma parameters of the equivalent element $G_{YEQ}$ of a plurality of Gamma elements in terminal Y.

Terminal Y determines first whether there is a Gamma distortion in the received multi-picture video according to the correction flag. In the present embodiment, the multi-picture video received by terminal Y is free from Gamma distortion. Thus, terminal Y only needs to consider the Gamma characteristics of terminal Y itself when performing correction.

2. Terminal Y calculates the Gamma parameters of the correction element $G_{Cor}$ according to $G_{YEQ}$.

$G_{YEQ}$ here refers to equivalent Gamma characteristics of terminal Y.

3. Terminal Y performs correction for the multi-picture video from the MCU.

The specific correction may employ the direct calculation method based on the function representation, or the look-up table method based on the look-up table. For the detailed situation, reference may be made to the above general correction method for Gamma characteristics.

Embodiment IV: Multi-Picture Mode, a Second Gamma Correction Method when the MCU Operates in the Composition Mode, in which a Decoding is First Performed, and then an Encoding is Performed The MCU does not perform Gamma correction after the uncompressed format is restored through decompression and decoding of the sub-picture video from terminals $X_1, X_2, \ldots, X_C$. Instead, the multi-picture image is obtained through combination directly, and then the encoding and compression is performed to form a multi-picture video bit-stream. Subsequently, the correction flag indicating the Gamma distortion is set on the Gamma track of the video bit-stream, the original Gamma parameter information carried by the Gamma track of video bit-stream from each terminal is copied to a position corresponding to the sub-picture video in turn according to the arrangement of each sub-picture specified by the designated multi-picture layout, to form a Gamma track of the multi-picture video bit-stream.

Referring to FIG. 11, which is a schematic diagram showing the processing in the terminal, when terminal Y receives the multi-picture video, the processing method is as follows:

1. Terminal Y performs decompression and decoding for the multi-picture video bit-stream to restore the uncompressed format, so that the uncompressed format of respective sub-picture is obtained.

2. Terminal Y extracts the Gamma parameter information corresponding to each sub-picture from the Gamma track of the multi-picture video bit-stream.

3. Assuming that for the Gamma parameters of the sub-picture i ($1 \leq i \leq C$), there are $N_1$ Gamma elements, and these Gamma elements are cascaded to form an equivalent Gamma element $G^{(i)}_{XEQ}$, then terminal Y calculates the Gamma parameters of the equivalent element $G^{(i)}_{XEQ}$.

Meanwhile, terminal Y calculates the Gamma parameters of the equivalent element $G_{YEQ}$ of the Gamma elements in terminal Y.

4. Terminal Y calculates the Gamma parameters of the correction element $G_{Cor}$ according to $G^{(i)}_{XEQ}$ and $G_{YEQ}$.

5. Terminal Y performs correction for the video of sub-picture i according to the Gamma parameters of $G_{Cor}$, and displays the video.

Terminal Y repeats the above processes 3-5, until all the sub-pictures are corrected.

The specific correction may employ the direct calculation method based on the function representation, or the look-up table method based on the look-up table. For the detailed situation, reference may be made to the above general correction method for the Gamma characteristics.

Embodiment V: Multi-Picture Mode, Gamma Correction when the MCU Operates in the Direct Composition Mode In the direct composition mode, the MCU does not perform processing for the video bit-stream from terminal $X_i$ ($1 \leq i \leq C$), but only performs bit-stream composition according to a manner that conforms with the grammar of the specific video compression and encoding protocol to form a composite bit-stream. The composite bit-stream has similarly a Gamma track. For this Gamma track, the MCU should first be configured with a correction flag. The correction flag indicates that there is a Gamma distortion in the video bit-stream.

When terminal Y receives the multi-picture video, the processing method is as follows:

1. Terminal Y extracts the Gamma parameter information corresponding to each sub-picture from the Gamma track of the multi-picture video bit-stream.

2. Assuming that for the Gamma parameters of the sub-picture i ($1 \leq i \leq C$), there are $N_1$ Gamma elements, and these Gamma elements are cascaded to form an equivalent Gamma element $G^{(i)}_{XEQ}$, then terminal Y calculates the Gamma parameters of the equivalent element $G^{(i)}_{XEQ}$ according to Equation 2.

Meanwhile, terminal Y calculates the Gamma parameters of the equivalent element $G_{YEQ}$ of the Gamma elements in terminal Y.

3. Terminal Y locates and extracts the video bit-stream corresponding to the sub-picture I from the composite bit-stream, and then performs decompression and decoding to restore the uncompressed format.

4. Terminal Y calculates the Gamma parameters of the correction element $G_{Cor}$ according to $G^{(i)}_{XEQ}$ and $G_{YEQ}$.

5. Terminal Y performs correction for the video of sub-picture i according to the Gamma parameters of $G_{Cor}$.

Terminal Y repeats the above steps 1-5, until all the sub-pictures are corrected.

The specific correction may employ the direct calculation method based on the function representation, or the look-up table method based on the look-up table. For the detailed situation, reference may be made to the above general correction method for the Gamma characteristics.

Embodiment VI: The MCU with Gamma Correction Function

Figure 14:
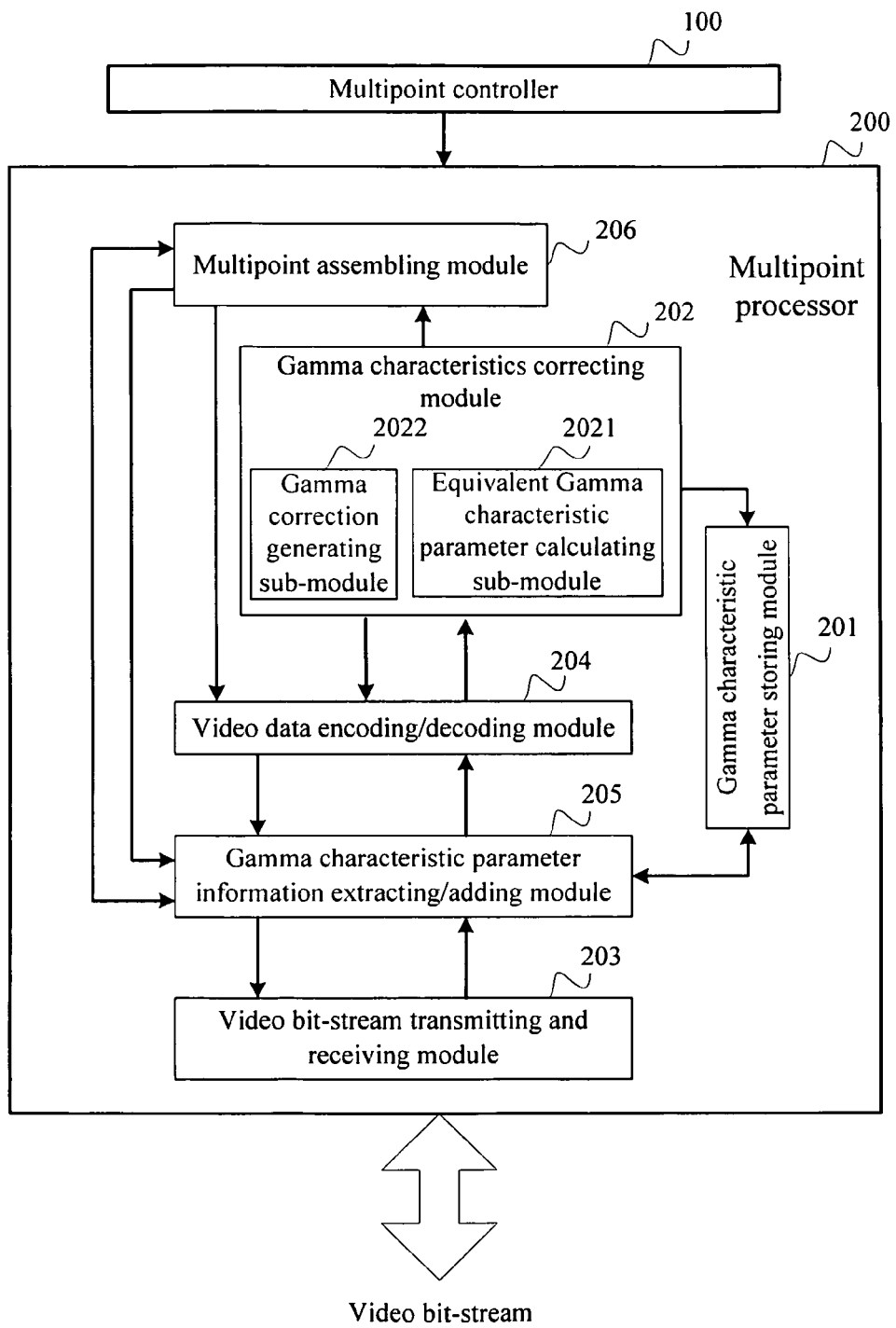
FIG. 14 is a schematic diagram showing the structure of an MCU with a Gamma characteristic correction function for video according to a sixth embodiment of the present disclosure.

The present disclosure further provides an MCU with the Gamma correction function to implement a correction for the Gamma characteristics of the video image on MCU side. The MCU includes a multipoint controller 100 and a multipoint processor 200. Comparing with the structure of the MCU in the prior art, the MCU with the Gamma correction function according to the present disclosure is mainly improved with respect to the multipoint processor 200. As shown in FIG. 14, the multipoint processor 200 includes the following function modules:

a Gamma characteristic parameter storing module 201, adapted to store the Gamma characteristic parameter of a video image transmitting terminal;

a Gamma characteristics correcting module 202 connected with the Gamma characteristic parameter storing module 201, adapted to correct the Gamma characteristics of the video image according to the Gamma characteristic parameter of the video image transmitting terminal;

a video bit-stream transmitting and receiving module 203, adapted to transmit and receive the video bit-stream, where the video bit-stream includes the video image data and the Gamma characteristic parameter information of the video bit-stream transmitting terminal;

a video data encoding/decoding module 204 connected between the video bit-stream transmitting and receiving module 203 and the Gamma characteristics correcting module 202, adapted to decode the video data from the video bit-stream and input the decoded data into the Gamma characteristics correcting module 202 for correction, or adapted to encode the video data based on the corrected video image;

a Gamma characteristic parameter information extracting/adding module 205 connected between the video bit-stream transmitting and receiving module 203 and the video data encoding/decoding module 204, adapted to extract the Gamma characteristic parameter information of the transmitting terminal from the received video bit-stream, and store the Gamma characteristic parameter information into the Gamma characteristic parameter storing module 201, or is adapted to extract the Gamma characteristic parameter information from the Gamma characteristic parameter storing module 201, and add the Gamma characteristic parameter information to the video bit-stream to be transmitted; and a multi-picture assembling module 206 connected with the Gamma characteristics correcting module 202, adapted to assemble the received video images of at least two terminals into a multi-picture image, and input the multi-picture image into the video data encoding/decoding module 204.

When it is not required to perform multi-picture assembling, the Gamma characteristics correcting module 202 sends the corrected video image to the video data encoding/decoding module 204 directly.

Meanwhile, the multi-picture assembling module 206 is connected with the Gamma characteristic parameter information extracting/adding module 205 directly. When the direct composition mode is employed, it is not required to encode/decode the video bit-stream.

The modes of multi-picture assembling are preconfigured in the multi-picture assembling module 206 and Gamma characteristic parameter information extracting/adding module 205. The multi-picture assembling is performed and the sequence for adding the Gamma characteristic parameter information of each sub-picture into the video bit-stream is determined according to the corresponding assembling mode.

Where the Gamma characteristics correcting module 202 includes:

an equivalent Gamma characteristic parameter calculating sub-module 2021, adapted to calculate the equivalent Gamma characteristic parameters according to characteristic parameters of a single Gamma element of the transmitting terminal, and input the equivalent Gamma characteristic parameters into a Gamma correction generating sub-module 2022;

a Gamma correction generating sub-module 2022, adapted to correct the Gamma characteristics of the video image according to the equivalent Gamma characteristic parameters.

The multipoint processor 200 is connected with the multipoint controller 100, and performs Gamma characteristics correction for the received video image according to instructions of the multipoint controller 100.

Same as in the prior art, a plurality of multipoint processors 200 may be arranged parallelly in a multipoint control unit, so that the communication among even more multimedia communication terminals may be controlled.

When the correction is not to be performed, the video bit-stream receiving/transmitting module 203 directly forwards the video bit-stream according to the instructions of the multipoint controller.

Hereinafter, a method for exchanging Gamma parameter information between terminals as well as between a terminal and a multipoint control unit will be illustrated in detail. Because the look-up table method has a prominent advantage, the look-up table method is employed for exchanging Gamma parameters in the present disclosure.

First, a binary format for representing the Gamma parameter information is provided, where this binary format is independent of the specific protocol. Gamma characteristics are represented with a function, the domain of definition of the function (value range of $L_{in}$) and the range of values (value range of $L_{out}$) are interval [0, 1] or a subinterval, such as [0.1, 0.9].

As described above, the key points of the look-up table method are two sets (or sequences) $\{L_{in}(i)|0 \leq i \leq N-1\}$ and $\{L_{out}(i)|0 \leq i \leq N-1\}$ and the corresponding relation between the elements of these two sets. It is defined that $\{L_{in}(i)|0 \leq i \leq N-1\}$ is a set of discrete values of input luminance, and $\{L_{out}(i)|0 \leq i \leq N-1\}$ is a set of discrete values of output luminance. According to the requirements for the domain of definition and range of values with respect to the function of the Gamma characteristics, the values of $L_{in}$ and $L_{out}$ should be within the interval [0, 1]. However, in the practical application, the value ranges of the input luminance and output luminance of the Gamma element may not be in the interval [0, 1]. To make the value ranges consistent with the definition of Gamma, the input luminance is practically first normalized during processing for the Gamma characteristics based on a function form. The luminance signal whose value is within the interval [0, 1] is called normalized luminance $L^n_{in}$, where the superscript n indicates "normalized". The luminance signal whose value is between 0 and $MaxL^a_{in}$ is called actual luminance $L^a_{in}$, where superscript a indicates "actual". The method for mapping the actual luminance to the interval [0, 1] is as shown in Equation 10:

$$L^n_{in} = L^a_{in}/MaxL^a_{in} \qquad (10)$$

Correspondingly, the output luminance signal should be restored from the normalized value to the actual value (inverse normalization). The calculation is as shown in Equation 11:

$$L^n_{out} = L^a_{out}/MaxL^a_{out} \qquad (11)$$

At present, 256 levels of luminance is employed in the video recorder/camera, display and the format for intermediate digital video exchange such as Common Interchange Format (CIF). In other words, the values of the actual input or output luminance are integers between 0 and 255, i.e., $MaxL^a_{in} = MaxL^a_{out} = 255$. Generally, $MaxL^a_{in} \neq MaxL^a_{out}$. Considering the possibility of technical advance in the future, the development of the video recorder and display, as well as the requirements for a higher level resolution of luminance raised by the human sense organ, the number of luminance levels may be increased. From the aspect of technical implementation, the increase of the number of luminance levels may be an integer power of 2, such as 512 or even 1024. The general form is $2^D$, where D is a natural number. As shown in Equation 12 and Equation 13:

$$L^n_{in} = L^a_{in}/2^D \qquad (12)$$

$$L^n_{out} = L^a_{out}/2^D \qquad (13)$$

However, when constructing $\{L_{in}(i)|0 \leq i \leq N-1\}$ and $\{L_{out}(i)|0 \leq i \leq N-1\}$, the actual application scenario should be considered. In the existing video communication technology, the luminance signal has 256 levels, and the luminance value is between 0 and 255, each luminance value may be represented with 8 bits (1 byte).

Thus, $\{L_{in}(i)|0 \leq i \leq N-1\} = \{0, 1, 2, 3, 4 \ldots 254, 255\}$, whereas each value of $\{L_{out}(i)|0 \leq i \leq N-1\}$ belongs to $\{0, 1, 2, 3, 4 \ldots 254, 255\}$.

Under above assumptions, the data structure of look-up table representation suitable for the Gamma characteristics of the existing video communication technology is still as shown in Table 1. After a further analysis, it is found that the values in the left column of Table 1 are all fixed, i.e., the values are necessarily in a sequence of $\{0, 1, 2, 3, 4 \ldots 254, 255\}$, and both parties of the communication knows this set and sequence. Therefore, the values in the left column do not need to be transferred during the communication.

When the Gamma parameter information is transferred with a communication protocol, no matter what the protocol is, a general method is to define a block or region in the data area, where it is allowed by the communication protocol to extend and customize contents, to store the binary bit-stream of the Gamma parameters consecutively. Then the block is encapsulated in the bit-stream of the protocol for transmission. This data area is called Gamma parameter information area.

Figure 15:
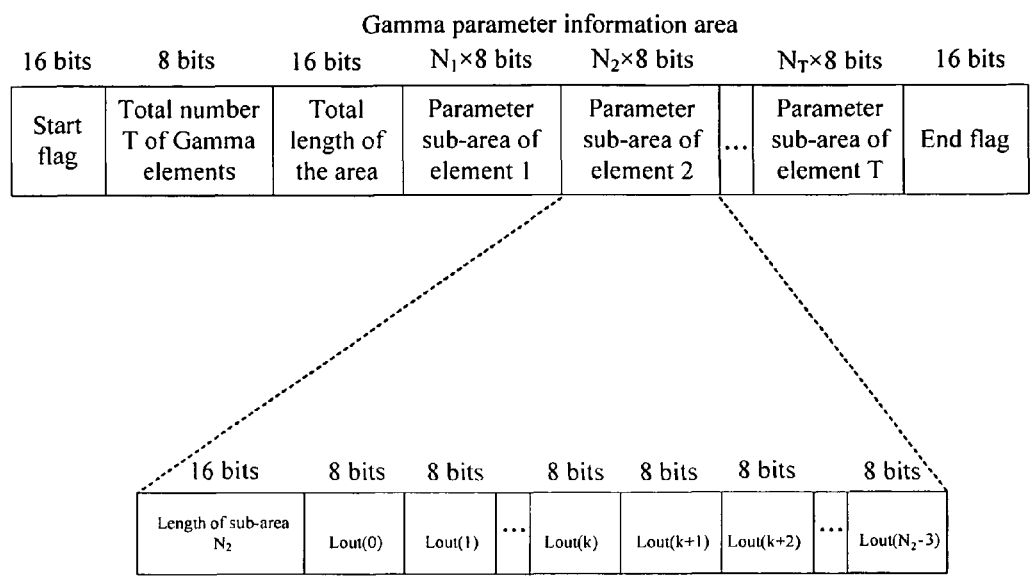
FIG. 15 is a schematic diagram showing a binary format of a Gamma parameter information area defined by the present disclosure.

There may be a plurality of Gamma elements including video recorder/camera or display device in a multimedia communication terminal. Therefore, when a terminal needs to transfer all the Gamma parameter information of itself to other communication terminal or other device in the network such as a multipoint control unit, the Gamma characteristic parameters of all the Gamma elements of this terminal should be written into the Gamma parameter information area according to a cascading sequence from anterior to posterior (or from posterior to anterior). The receiving terminal or other network devices may extract the Gamma parameter information from the information area carrying Gamma parameters in turn. Thus, the specific format of the Gamma parameter information area may be defined as shown in FIG. 15, where the format includes following parts:

a start flag: 16 bits (2 bytes), the value is 0x0FF0;

an end flag: 16 bits (2 bytes), the value is 0xF00F;

a total length of the area: 16 bits (2 bytes), which is the total length (including the start flag and end flag) of the Gamma parameter information area with a unit of byte.

With the combination of above three parts, the location of the Gamma information area in the bit-stream may be determined.

The total number of Gamma elements is represented with T in 8 bits (1 byte). There are maximum 256 Gamma elements, which is sufficient for practical application.

Element 1-T parameter sub-area: There are T sub-areas totally, which correspond to T Gamma elements respectively.

The structure of each sub-area is defined as follows:

Sub-area length: 16 bits (2 bytes), the sub-area length (including a transfer mode byte) is represented with a unit of byte.

Consecutive parameters: $L_{out}(0)$, $L_{out}(1)$ . . . $L_{out}(N_i-3)$, where i=1, 2 . . . T.

It should be noted that the above manner of definition is only an embodiment of the present disclosure, which does not limit the protection scope of the disclosure.

The format of the Gamma parameter information area independent of the specific bearing protocol is defined above. If the coding mode of H.264 protocol is employed in the video bit-stream, a method for bearing Gamma parameter information with the message extension mechanism of H.264 is provided in combination with the H.264 protocol in the present disclosure.

A plurality of mechanisms for performing message extension are provided in H.264, where the Supplement Enhancement Information (SEI) defined in H.264 is suitable for application in the present disclosure. The data representation area of SEI is independent of the video coding data, and the using method is given in the description of network abstraction layer (NAL) in H.264 protocol. The basic unit of the H.264 bit-stream is NAL unit (NALU). The NALU may bear various data type of H.264, such as video sequence parameters, picture parameters, slice data (i.e., the specific image data) and the data of SEI message. The SEI is adapted to transfer various messages, and supports message extension. Therefore, the customized messages for a specific object may be transferred in the SEI field, and the compatibility of the video communication system based on H.264 is not affected. The NALU bearing the SEI message is referred to as SEI NALU. One SEI NALU may include one or more SEI messages. Each SEI message may include some variables, especially Payload Type and Payload Size. These variables indicate the type and size of the message payload. In H.264 Annex D.8 and D.9, the grammar and meaning of some commonly used H.264 SEI messages are defined.

The payload included in the NALU is referred to as Raw-Byte Sequence Payload (RBSP). SEI is a type of RBSP. According to the definition of H.264 7.3, the grammar of SEI RBSP is as shown in Table 2:

TABLE 2

| Grammar of SEI RBSP | | |
|---|---|---|
| sei_rbsp ( ) { | C | Descriptor |
| Do | | |
| sei_message ( ) | 5 | |
| while ( more_rbsp_data ( ) ) | | |
| rbsp_trailing_bits ( ) | 5 | |
| } | | |

It can be seen that the SEI RBSP in a NALU may include a plurality of SEI messages. The structure of an SEI message is as shown in Table 3:

TABLE 3

| Structure of SEI message | | |
|---|---|---|
| sei_message ( ) { | C | Descriptor |
| payloadType = 0 | | |
| while ( next_bits ( 8 ) = = 0xFF ) { | | |
| ff_byte /* equal to 0xFF */ | 5 | f (8) |
| payloadType += 255 | | |
| } | | |
| last_payload_type_byte | 5 | u (8) |
| payloadType += last_payload_type_byte | | |
| payloadSize = 0 | | |
| while ( next_bits ( 8 ) = = 0xFF ) { | | |
| ff_byte /* equal to 0xFF */ | 5 | f (8) |
| payloadSize += 255 | | |
| } | | |
| last_payload_size_byte | 5 | u (8) |
| payloadSize += last_payload_size_byte | | |
| sei_payload ( payloadType, payloadSize ) | 5 | |
| } | | |

H.264 Annex D.8 defines the reserved grammar message structure for future extension as shown in Table 4:

TABLE 4

| Extensible SEI message structure | | |
|---|---|---|
| reserved_sei_message ( payloadSize ) | C | Descriptor |
| { | | |
| for ( i = 0; i < payloadSize; i++ ) | | |
| reserved_sei_message_payload_byte | 5 | b (8) |
| } | | |

In the description of the present disclosure, the data representation area of SEI is referred to as SEI field for short. Each SEI field may include one or more SEI messages, and the SEI message is constituted with SEI header information and an SEI payload. The SEI header information includes two code words. One code word indicates the type of the payload in the SEI message, and the other code word indicates the size of the payload. When the payload type is between 0 and 255, one byte between 0x00 and 0xFE is used for representation. When the type is between 256 and 511, two bytes between 0xFF00 and 0xFFFF are used for representation. When the type is larger than 511, the method for representation may be deduced in the same way. Thus, a user may customize any number of payload types. In the standard, type 0 to type 18 are defined as specific information, such as buffering period and image timing. For the technical solution provided by the disclosure, the type of the area for bearing the Gamma parameter information may be defined to be any SEI payload type that is not defined at present yet. Because it is quite possible that there are a lot of extended message types for other purposes, the payload type may be defined as 0xFFFF (511) to avoid collision, where 0xFFFF is the maximal value theoretically. Then the Gamma parameter information area filled according to the definition is put into the SEI payload directly. Thus, the object of bearing and transmitting Gamma parameter information with the SEI message extension mechanism is realized.

It should be noted that it is only an embodiment of the present disclosure that the value of the SEI payload type is 0xFFFF. Other values of the SEI payload type also fall within the protection scope of the present disclosure.

In a word, the present disclosure provides two methods for correcting Gamma characteristics in the multimedia communication:

One method is implemented in the video image receiving terminal. The video image receiving terminal performs a one-time correction according to the Gamma characteristic parameters of the local terminal and that of the transmitting terminal.

In the other method, correction is performed step by step in the multipoint control unit and the video receiving terminal. First, the multipoint control unit corrects the Gamma distortion introduced by the Gamma elements of the transmitting terminal according to the Gamma characteristic parameter of the transmitting terminal. Then, the video receiving terminal corrects the Gamma distortion introduced by the Gamma elements of the video receiving terminal according to the Gamma characteristic parameters of the video receiving terminal.

The above methods may be selected according to the specific scenarios of the multimedia communication, so that the Gamma distortion of the video image introduced by each element from collecting, transmitting, receiving to displaying may be well corrected.

Various variations and modifications will readily occur to those skilled in the art without departing from the spirit and scope of the present disclosure. Therefore, when the variations and modifications of the present disclosure fall within the scope defined by the claims of the present disclosure and the equivalent technologies, such variations and modifications are also intended to be included by the present disclosure.

What is claimed is:

1. A method for correcting Gamma characteristics of a video bit-stream in video communications, the method comprising:

receiving, by a receiving terminal, a video bit-stream sent from a transmitting terminal, wherein the video bit-stream comprises video data generated according to a video image of the transmitting terminal, and comprises Gamma characteristic parameter information of the transmitting terminal;

restoring the video image according to the video data; and performing Gamma correction for the video image according to Gamma characteristic parameter information of the receiving terminal and the Gamma characteristic parameter information of the transmitting terminal;

wherein the Gamma characteristic parameter information of the transmitting terminal comprises Gamma characteristic parameters of each Gamma characteristic element passed by the video image in the transmitting terminal during processes of collecting and processing of the video image as well as forming the video bit-stream, and a cascading sequence of each Gamma characteristic element; or equivalent Gamma characteristic parameters determined by the transmitting terminal according to all the Gamma characteristic elements that are passed.

2. The method according to claim 1, wherein the video bit-stream received by the receiving terminal comprises a multi-picture video bit-stream combined, by a multipoint control unit, from video bit-streams from at least two transmitting terminals.

3. The method according to claim 2, wherein the multi-picture video bit-stream is combined and the Gamma correction is performed by:

restoring, by the multipoint control unit, the video image according to the video data of each transmitting terminal, taking the video image as a sub-picture respectively and assembling sub-pictures into a multi-picture video, generating the video data of the multi-picture image, and combining the video data of the multi-picture image and the Gamma characteristic parameter information corresponding to each sub-picture into a multi-picture video bit-stream, and sending the multi-picture video bit-stream to the receiving terminal, wherein a sequence of the Gamma characteristic parameter information of the sub-pictures is determined according to assembling positions and a sequence of the sub-pictures; and restoring, by the receiving terminal, the multi-picture image according to the video data of the multi-picture image, and correcting the video image of each sub-picture according to the Gamma characteristic parameter information of the receiving terminal and the Gamma characteristic parameters corresponding to each sub-picture.

4. The method according to claim 2, wherein the multi-picture video bit-stream is combined and the Gamma correction is performed by:

extracting, the multipoint control unit, the video data in the video bit-stream from each transmitting terminal, performing composition directly according to an assembling sequence of the sub-pictures, and then combining the composed video data and the Gamma characteristic parameter information corresponding to each sub-picture into a multi-picture video bit-stream, and sending the multi-picture video bit-stream to the receiving terminal, wherein the sequence of the Gamma characteristic parameter information of the sub-pictures is determined according to assembling positions and a sequence of the sub-pictures; and extracting, the receiving terminal, the video data corresponding to each sub-picture from the composed video data, restoring the video image of each sub-picture, and correcting the video image of each sub-picture according to the Gamma characteristic parameter information of the receiving terminal and the Gamma characteristic parameters corresponding to each sub-picture, and then assembling the sub-pictures corrected into a multi-picture image according to the assembling sequence.

5. The method according to claim 1, wherein the video bit-stream further comprises indication information for identifying whether a Gamma distortion exists in the video image, and the receiving terminal determines whether the multi-picture video bit-stream carries the Gamma characteristic parameter information according to the indication information.

6. The method according to claim 1, wherein the Gamma characteristic parameters of each Gamma element or the equivalent Gamma characteristic parameters comprise a set of output luminance signal values corresponding to each level of input luminance signal values of preconfigured levels.

7. The method according to claim 6, wherein a Gamma parameter information area is extended in the video bit-stream, the Gamma parameter information area respectively comprises the Gamma parameter information, a set of the input luminance signal values and/or a set of output luminance signal values form/forms a binary bit-stream, and the binary bit-stream is carried in the Gamma parameter information area for transmission.

8. The method according to claim 6, wherein, when an H.264 protocol encoding is employed in the video bit-stream, a message for carrying the Gamma parameter information is obtained through extending a field of Supplement Enhancement Information of an H.264 bit-stream.

9. A method for correcting Gamma characteristics of a video bit-stream in a video communication, comprising:

sending, by a video bit-stream transmitting terminal, a first video bit-stream to a multipoint control unit, wherein the first video bit-stream comprises video data generated according to a video image of the transmitting terminal and Gamma characteristic parameter information of the transmitting terminal;

receiving, by the multipoint control unit, the first video bit-stream, restoring the video image according to the video data, and performing a one-time Gamma correction for the video image according to the Gamma characteristic parameter information of the transmitting terminal; and generating video data of the video image that is one-time corrected, putting the video data generated into a second video bit-stream, and sending the second video bit-stream to a receiving terminal;

wherein the Gamma characteristic parameter information of the transmitting terminal comprises Gamma characteristic parameters of each Gamma characteristic element passed by the video image in the transmitting terminal during processes of collecting and processing of the video image as well as forming the video bit-stream, and a cascading sequence of each Gamma characteristic element; or equivalent Gamma characteristic parameters determined by the transmitting terminal according to all the Gamma characteristic elements that are passed.

10. The method according to claim 9, after sending the second video bit-stream to the receiving terminal, the method further comprising:
    receiving, by the receiving terminal, the second video bit-stream, restoring the video image that is corrected, and performing correction again according to the Gamma characteristic parameters of the receiving terminal.

11. The method according to claim 10, wherein the method further comprises:
    correcting, by the multipoint control unit, respectively the video images of the first video bit-streams from at least two transmitting terminals, and assembles the video images into a multi-picture image, and
    generating video data of the multi-picture image according to the multi-picture image, and carrying in the second video bit-stream and sending to the receiving terminal.

12. The method according to claim 11, wherein the method further comprises:
    restoring, by the receiving terminal, the multi-picture image according to the video data of the multi-picture image, and correcting the video image of each sub-picture again according to the Gamma characteristic parameters of the receiving terminal.

13. The method according to claim 9, wherein the video bit-stream further comprises a first piece of indication information for identifying whether a Gamma distortion exists in the video image, and determining, by the multipoint control unit, that the Gamma characteristic parameter information of the transmitting terminal is carried in the first video bit-stream according to the first indication information.

14. The method according to claim 9, wherein the Gamma characteristic parameters of each Gamma element or the equivalent Gamma characteristic parameters comprise a set of output luminance signal values corresponding to each level of input luminance signal values of preconfigured levels.

15. The method according to claim 14, wherein a Gamma parameter information area is extended in the video bit-stream, the Gamma parameter information area respectively comprises the Gamma parameter information, a set of the input luminance signal values and/or a set of output luminance signal values form/forms a binary bit-stream, and the binary bit-stream is carried in the Gamma parameter information area for transmission.

16. The method according to claim 9, wherein when an H.264 protocol encoding is employed in the video bit-stream, a message for carrying the Gamma parameter information is extended in a Supplement Enhancement Information area of an H.264 bit-stream.

17. A multipoint control unit, comprising a multipoint processor, wherein the multipoint processor comprises:
    a Gamma characteristic parameter storing module, adapted to store Gamma characteristic parameters of a video image transmitting terminal; and
    a Gamma characteristic correcting module connected with the Gamma characteristic parameter storing module, adapted to correct Gamma characteristics in the video image according to the Gamma characteristic parameters of the video image transmitting terminal;
    wherein the Gamma characteristic parameter information of the transmitting terminal comprises Gamma characteristic parameters of each Gamma characteristic element passed by the video image in the transmitting terminal during processes of collecting and processing of the video image as well as forming the video bit-stream, and a cascading sequence of each Gamma characteristic element; or equivalent Gamma characteristic parameters determined by the transmitting terminal according to all the Gamma characteristic elements that are passed.

18. The multipoint control unit according to claim 17, wherein the multipoint processor further comprises:
    a video bit-stream transmitting and receiving module, adapted to transmit and receive the video bit-stream, wherein the video bit-stream comprises video image data and the Gamma characteristic parameter information of the video bit-stream transmitting terminal; and
    a video data encoding/decoding module connected between the video image transmitting and receiving module and the Gamma characteristics correcting module, adapted to decode the video data from the video bit-stream and input the decoded data into the Gamma characteristics correcting module for correction, or adapted to encode the video data based on the corrected video image.

19. The multipoint control unit according to claim 18, wherein the multipoint processor further comprises:
    a Gamma characteristic parameter information extracting/adding module connected between the video bit-stream transmitting and receiving module and the video data encoding/decoding module, adapted to extract the Gamma characteristic parameter information of the transmitting terminal from the received video bit-stream, and store the Gamma characteristic parameter information into the Gamma characteristic parameter storing module, or is adapted to extract the Gamma characteristic parameter information from the Gamma characteristic parameter storing module, and add the Gamma characteristic parameter information to the video bit-stream to be transmitted.

20. The multipoint control unit according to claim 17, wherein the multipoint processor further comprises:
    a multi-picture assembling module connected with the Gamma characteristics correcting module, adapted to assemble the received video images of at least two terminals into a multi-picture image, and input the multi-picture image into a video data encoding/decoding module or the Gamma characteristic parameter information extracting/adding module.

21. The multipoint control unit according to claim 17, wherein the Gamma characteristics correcting module comprises:
    an equivalent Gamma characteristic parameter calculating sub-module, adapted to calculate equivalent Gamma characteristic parameters according to characteristic parameters of a single Gamma element of the transmitting terminal, and input the equivalent Gamma characteristic parameters into a Gamma correction generating sub-module;
    the Gamma correction generating sub-module, adapted to correct the Gamma characteristics of the video image according to the equivalent Gamma characteristic parameters.

22. The multipoint control unit according to claim 17, wherein the multipoint control unit further comprises: a multipoint controller connected with the multipoint processor, adapted to send a control signal of performing Gamma characteristic correction to the multipoint processor.

23. A method for correcting Gamma characteristics of a video bit-stream in video communications, comprising:

receiving, by a receiving terminal, the video bit-stream, wherein the video bit-stream comprises video data generated according to a video image of a transmitting terminal, and comprises Gamma characteristic parameter information of the transmitting terminal, and restoring the video image according to the video data, and performing Gamma correction for the video image according to the Gamma characteristic parameter information of the receiving terminal and the Gamma characteristic parameter information of the transmitting terminal;

wherein the Gamma characteristic parameter information of the transmitting terminal comprises Gamma characteristic parameters of each Gamma characteristic element passed by the video image in the transmitting terminal during processes of collecting and processing of the video image as well as forming the video bit-stream, and a cascading sequence of each Gamma characteristic element; or equivalent Gamma characteristic parameters determined by the transmitting terminal according to all the Gamma characteristic elements that are passed.

24. A method for correcting Gamma characteristics of a video bit-stream in video communications, comprising:

receiving, by a multipoint control unit, the first video bit-stream, wherein the first video bit-stream comprises video data generated according to a video image of a transmitting terminal and Gamma characteristic parameter information of the transmitting terminal, restoring the video image according to the video data, and performing a one-time Gamma correction for the video image according to the Gamma characteristic parameter information of the transmitting terminal; and generating video data of the video image that is one-time corrected, putting the video data generated into a second video bit-stream, and sending the second video bit-stream to a receiving terminal;

wherein the Gamma characteristic parameter information of the transmitting terminal comprises Gamma characteristic parameters of each Gamma characteristic element passed by the video image in the transmitting terminal during processes of collecting and processing of the video image as well as forming the video bit-stream, and a cascading sequence of each Gamma characteristic element; or equivalent Gamma characteristic parameters determined by the transmitting terminal according to all the Gamma characteristic elements that are passed.

* * * * *